United States Patent
Heidari et al.

(10) Patent No.: US 8,322,038 B1
(45) Date of Patent: Dec. 4, 2012

(54) METHOD OF MANUFACTURING A BEARING HOUSING FOR AN ENGINE WITH STRESS AND STIFFNESS CONTROL

(75) Inventors: Mohammad A. Heidari, Bellevue, WA (US); Adrian Stanescu, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 12/426,435

(22) Filed: Apr. 20, 2009

(51) Int. Cl.
B21D 53/10 (2006.01)

(52) U.S. Cl. .......... 29/898.062; 29/898; 29/898.06; 29/898.07; 384/513; 384/535; 384/581

(58) Field of Classification Search ........... 29/898.07, 29/898.062; 384/513, 535, 581; 360/265.6
See application file for complete search history.

(56) References Cited

U.S. PATENT DOCUMENTS

| | | | |
|---|---|---|---|
| 4,304,522 A | 12/1981 | Newland | |
| 4,451,110 A | 5/1984 | Forestier et al. | |
| 4,475,869 A | 10/1984 | Davies | |
| 5,603,602 A | 2/1997 | Romani | |
| 6,491,497 B1 | 12/2002 | Allmon et al. | |
| 6,634,103 B2 * | 10/2003 | Muraki et al. | 29/898.07 |
| 6,968,697 B2 | 11/2005 | Nguyen et al. | |
| 2007/0031078 A1 | 2/2007 | Hackett | |

OTHER PUBLICATIONS

Zeidan et al., "Design and Application of Squeeze Film Dampers in Rotating Machinery", Proceedings of the Twenty-Fifth Turbomachinery Symposium, 1996, pp. 169-188 http://www.bearingsplus.com/pdf_files/papers/turbomachinery/tms_vo12518_1996.pdf.
George et al., "Finite Element Analysis of Squirrel Cage Ball Bearings for Gas Turbine Engines", Defence Science Journal, vol. 57, No. 2, Mar. 2007, pp. 165-171.
Ejaz et al., "Failure Analysis of an Aero En gine Ball Bearing", Journal of Failure Analysis and Prevention, vol. 6(6) Dec. 2006, pp. 25-31.
Proposed Rules, Federal Register, vol. 71, No. 10, Jan. 17, 2006, pp. 2492.

* cited by examiner

Primary Examiner — Richard Chang
(74) Attorney, Agent, or Firm — Yee & Associates, P.C.

(57) ABSTRACT

A method for manufacturing a bearing housing comprising: selecting a configuration for housing and manufacturing the housing the configuration. The selected housing configuration comprises a bearing section and a base having a cylindrical shape. The bearing section and base are substantially aligned centrally along an axis. A plurality of members extends between the bearing section and the base. The plurality of members has a length and a width, and, in the configuration, each of the plurality of members has a side that is substantially non-perpendicular with respect to the bearing section and the base. At least one of the plurality of members extends at an angle from the bearing section to the base; the plurality of members having a curve relative to the axis; and the width of the plurality of members decreasing or increasing along the length of the plurality of members.

9 Claims, 21 Drawing Sheets

METHOD OF MANUFACTURING A BEARING HOUSING FOR AN ENGINE WITH STRESS AND STIFFNESS CONTROL

BACKGROUND INFORMATION

1. Field

The present disclosure relates generally to aircraft and, in particular, to aircraft engines. Still more particularly, the present disclosure relates to a method and apparatus for a bearing housing in an engine having stress and stiffness control capabilities.

2. Background

Aircraft may fly using many types of engines. For example, many commercial aircraft use turbo fan engines. A turbo fan engine has a ducted fan, which is powered by a gas turbine. The airstream passes through the gas turbine and through the fan duct to generate thrust. The fan blades in the ducted fan accelerate the air in a manner similar to a propeller. Some of the air passes through the gas turbine providing oxygen to burn fuel. The thrust produced by the turbo fan engine is typically a combination of around 85 percent of thrust generated by the fan and around 15 percent of thrust generated by the exhaust from the engine core.

Turbo fan engines have a number of different configurations. One configuration is a dual shaft turbo fan engine. This type of configuration has a fan and a low pressure compressor together with a low pressure turbine on a low pressure shaft and a high pressure compressor driven by a high pressure turbine on a high pressure shaft. The high pressure shaft may also be an engine core shaft.

The high pressure compressor of the turbo fan engine has several axial stages. These stages are assembled to form the forward part of the high pressure shaft of the engine. The high pressure shaft is supported at the front of the shaft by an assembly of bearings. For larger turbo fans, the forward assembly of bearings for the high pressure shaft is formed by a ball or thrust bearing and a roller or radial bearing. Typically, the outer races of these bearings are integrated into a bearing housing.

Further, the high pressure shaft of the engine is a rotating shaft. The rotating high pressure shaft is assembled to have a rotating balance within a selected amount of tolerance. This balance minimizes the amount of vibration that may occur due to rotation of the shaft during operation of the engine.

Over time, wear and tear on the blades and other portions of the shaft may result in the shaft becoming unbalanced or having a balance level that is out of a desired amount of tolerance. This change in balance will increase the amount of vibration. The amplitude and/or frequency of these vibrations may increase in a manner that may require shutting down the engine during flight and/or performing maintenance on the engine.

These types of vibrations may increase the stress and forces on other components in the engine. These vibrations may decrease the intervals at which maintenance on the engine is needed. With increased maintenance, the expense of maintaining an aircraft may increase. Further, with increased maintenance, the amount of time during which an aircraft is unavailable for use also increases.

Therefore, it would be advantageous to have a method and apparatus that takes into account one or more of these issues, as well as possibly other issues.

SUMMARY

In one advantageous embodiment, an apparatus comprises a bearing section capable of receiving bearings, a base, and a plurality of members. The bearing section and the base have a cylindrical shape and are substantially aligned centrally along an axis. The plurality of members extends between the bearing section and the base and have a length, a width, and wherein each of the plurality of members has a side that is substantially non-perpendicular with respect to the bearing section and the base.

In another advantageous embodiment, a method is present for manufacturing a bearing housing. A configuration for the bearing housing is selected. The bearing housing comprises a bearing section capable of receiving bearings, a base, and a plurality of members. The bearing section and the base have a cylindrical shape and are substantially aligned centrally along an axis. The plurality of members extend between the bearing section and the base and have a length and a width. In the configuration, each of the plurality of members has a side that is substantially non-perpendicular with respect to the bearing section and the base. The bearing housing is manufactured using the configuration.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
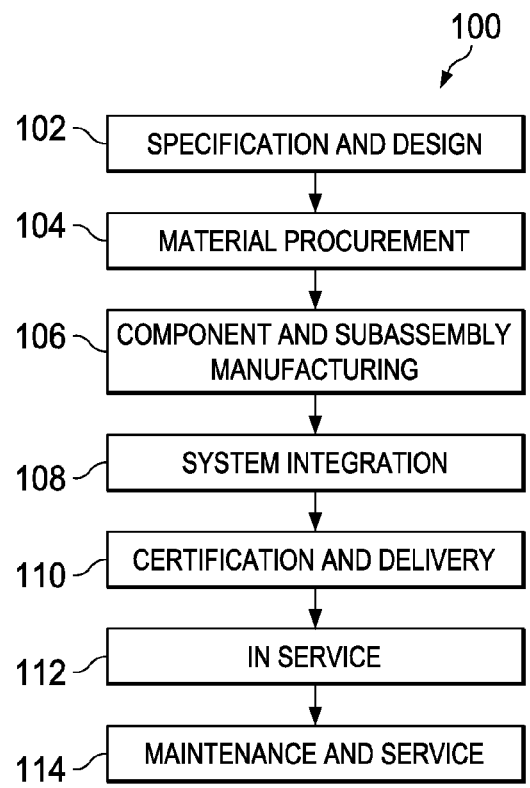
FIG. 1 is a diagram illustrating an aircraft manufacturing and service method in accordance with an advantageous embodiment.
Figure 2:
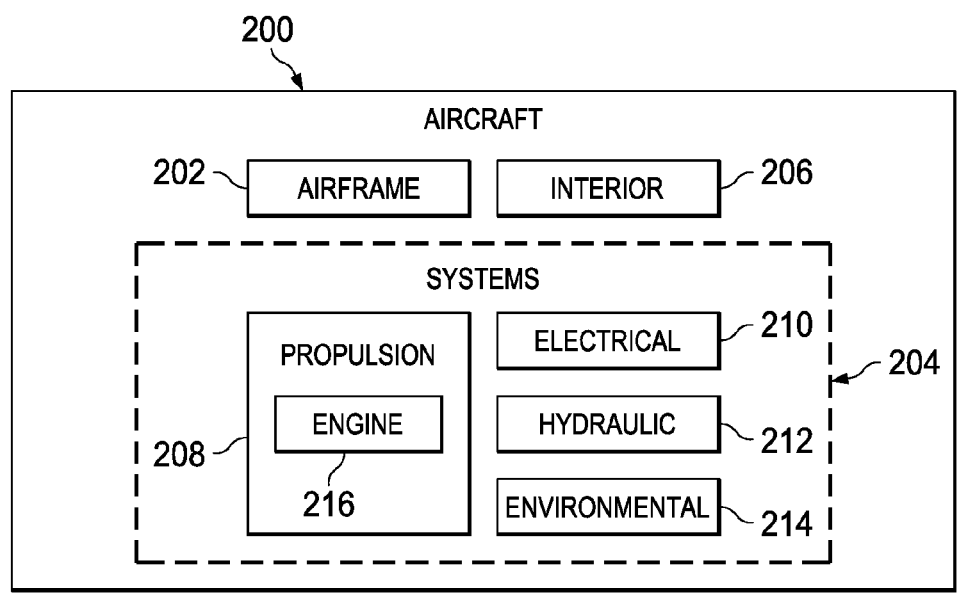
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. In this illustrative example, the different advantageous embodiments may be implemented in engine 216 within propulsion system 208. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As a specific example, one or more of the different advantageous embodiments may be implemented during specification and design 102 and component and subassembly manufacturing 106. Further, the different advantageous embodiments also may be utilized during maintenance and service 114.

The different advantageous embodiments recognize and take into account a number of considerations. For example, the different advantageous embodiments recognize and take into account that one component in which increased stress may occur from an unbalance in a shaft is a bearing system. The bearing system may include a bearing housing, ball bearings, and/or bearings. The different advantageous embodiments recognize and take into account that the stress and/or loads applied to currently available bearing housings increases the speed at which a bearing housing needs to be replaced. Further, the bearing housing may require shutting down the engine when the vibrations of the shaft exceed some level.

The different advantageous embodiments also recognize and take into account that currently available bearing housings have members that extend substantially perpendicular between a base and a bearing section. This type of extension between the base and bearing section means that the members extend without an angle. The different advantageous embodiments recognize and take into account that this configuration of these members may not provide the stress and/or stiffness that is desired.

The different advantageous embodiments recognize that by increasing the cross-sectional area and reducing the stress in a member, stiffness may be increased. The rotating shaft generates forces and/or loads that may make it impossible for currently available bearing housings to provide the increase in stiffness along with the desired reduction in stress on these members for the bearing housing. These members may be the weakest portion of the bearing housings.

Thus, the different advantageous embodiments provide a method and apparatus for a bearing housing that may be capable of controlling the stiffness of the bearing housing, as well as controlling the stress in the members extending between the bearing section and the base of the bearing housing.

The different advantageous embodiments may provide an apparatus having a bearing section, a base, and a plurality of members. The bearing section has a cylindrical shape and is capable of receiving a number of bearings. The base also is cylindrical in shape. The bearing section and the base are substantially aligned centrally along an axis. The plurality of members are non-linear. The plurality of members may have a configuration selected from at least one of extending at an angle from the bearing section to the base, having a curve relative to the axis, and having a width that changes along a length of the plurality of members.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Figure 3:
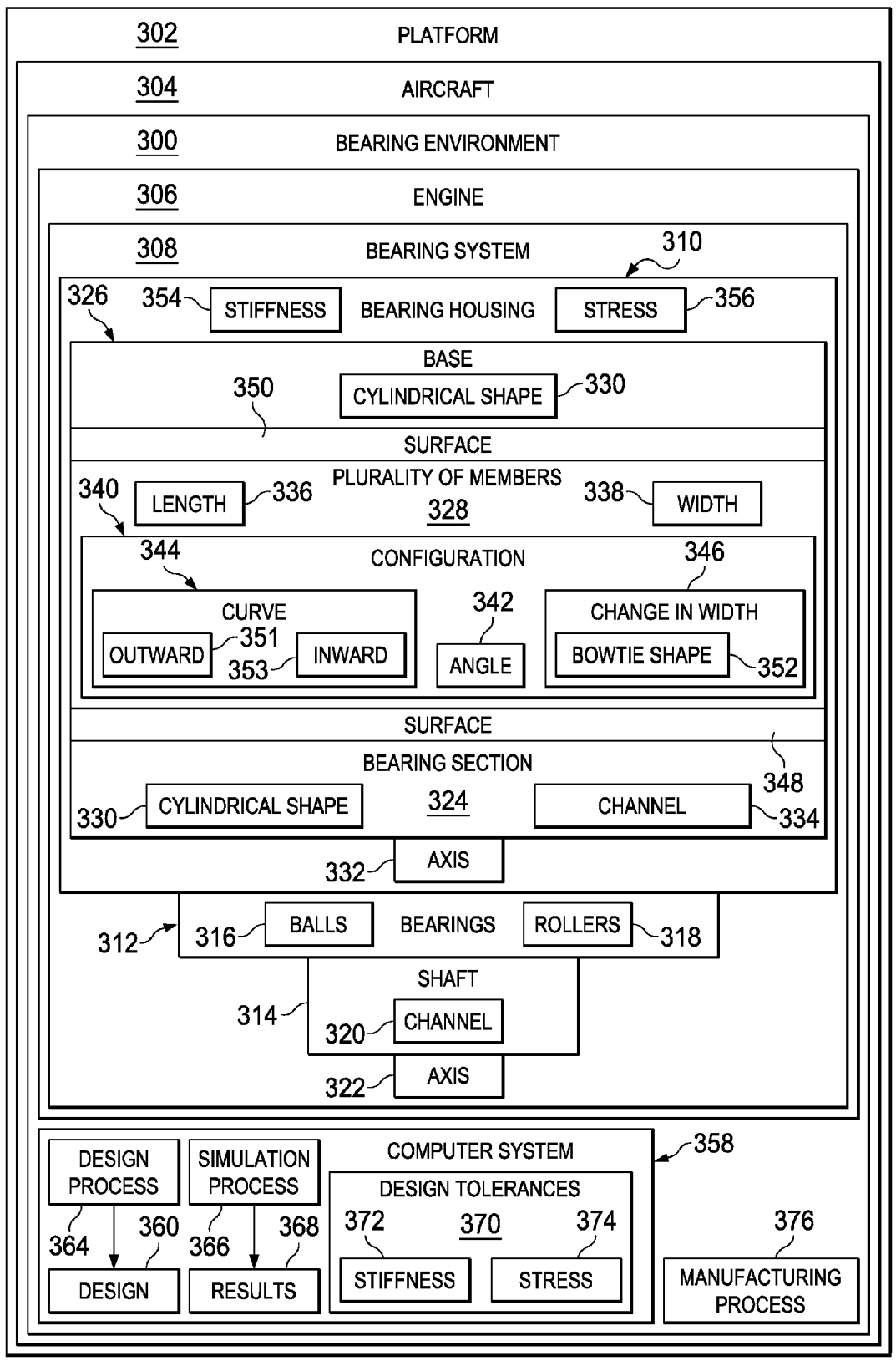
FIG. 3 is a diagram of a bearing environment in accordance with an advantageous embodiment.

With reference now to FIG. 3, a diagram of a bearing environment is depicted in accordance with an advantageous embodiment. In this illustrative example, bearing environment 300 may be located in platform 302. Platform 302, in this illustrative example, may take the form of aircraft 304. In this illustrative example, aircraft 304 may be one implementation of aircraft 200 in FIG. 2. In this illustrative example, aircraft 304 contains engine 306. Bearing system 308 may be located within engine 306.

In these illustrative examples, bearing system 308 includes bearing housing 310, bearings 312, and shaft 314. Bearings 312 may be, for example, without limitation, balls 316, rollers 318, and/or some other suitable type of bearings. In this illustrative example, shaft 314 may be aligned and rotated about axis 322.

Bearing housing 310 has bearing section 324, base 326, and plurality of members 328. Bearing housing 310 may be comprised of a number of different materials. For example, without limitation, bearing housing 310 may be comprised of a material selected from metal, a composite material, aluminum, steel, a steel alloy, titanium, a nickel alloy, a ceramic material, a plastic material, and/or some other suitable material. Bearing section 324 and base 326 both have cylindrical shape 330. Bearing section 324 and base 326 are substantially aligned centrally along axis 332. Bearing section 324 has channel 334. Channel 334 is configured to be capable of receiving bearings 312.

In these illustrative examples, plurality of members 328 extend between bearing section 324 and base 326. Plurality of members 328 have length 336, which may be measured as a length between bearing section 324 and base 326. Further, plurality of members 328 also have width 338.

Further, in these illustrative examples, shaft 314 also is substantially aligned centrally about axis 332. As a result, shaft 314 extends through bearing section 324 and base 326 of bearing housing 310. Shaft 314 may rotate about axis 322 using bearings 312 located between channel 334 in bearing section 324 and channel 320 of shaft 314.

In these illustrative examples, plurality of members 328 have configuration 340. In configuration 340, each of plurality of members 328 has side 329 that is substantially non-perpendicular with respect to bearing section 324 and the base 326. In these examples, side 329 for one member in plurality of members 328 is a side wall that is opposite a sidewall for another member in plurality of members 328.

Configuration 340 may be selected as at least one of angle 342, curve 344, and change in width 346. Angle 342 may be the angle at which plurality of members 328 extend from bearing section 324 to base 326. In these illustrative examples, plurality of members 328 may extend from bearing section 324 to base 326 with angle 342.

Angle 342 may be used in contrast to a substantially perpendicular configuration. Angle 342 is not considered to be present when plurality of members 328 extend from bearing section 324 to base 326 in a substantially perpendicular direction. Angle 342 means that plurality of members 328 do not extend in a direction substantially perpendicular from surface 348 of bearing section 324 to surface 350 of base 326.

Curve 344 may be a curve along length 336 of plurality of members 328. This curve may be relative to axis 322. For example, curve 344 may be outward 351, inward 353, and/or some other type of curve. Outward 351 means that plurality of members 328 have curve 344 that is outwards from axis 322. Inward 353 means that plurality of members 328 have curve 344 that is inwards towards axis 322. In other advantageous embodiments, curve 344 may be a more complex curve such as, for example, without limitation, an S-shaped curve and/or some other non-self-intersecting curve.

Change in width 346 means that at least a portion of plurality of members 328 have width 338 that changes along length 336. For example, change in width 346 may provide bowtie shape 352 in these illustrative examples.

Configuration 340 is selected to provide a desired level of stiffness 354 for bearing housing 310. Further, configuration 340 is selected to also reduce stress 356 on plurality of members 328. In this manner, configuration 340 for bearing housing 310 may be capable of providing a desired level of stiffness 354 and reduced stress 356 for bearing housing 310 as compared to a bearing housing having similar dimensions with substantially perpendicular members extending between a bearing section and a base.

Bearing housing 310 may be designed using computer system 358. Computer system 358 may be a number of computers that may be networked and/or otherwise in communication with each other.

Design 360 is created for bearing housing 310. Design 360 may include various parameters for bearing housing 310. For example, without limitation, design 360 may include dimensions for bearing housing 310, materials, and/or other suitable parameters. Design 360 may be created using design process 364. Design process 364 may be, for example, without limitation, a computer aided design program, application, or other suitable process.

After design 360 has been created, design 360 may be tested using simulation process 366. In these illustrative examples, simulation process 366 may take the form of a finite element analysis program. Simulation process 366 generates results 368. Results 368 are compared with design tolerances 370. Design tolerances 370 may include stiffness 372 and stress 374. Stress 374 may be a result for stiffness 354 for bearing housing 310. Stress 374 may be stress 356 for plurality of members 328. If results 368 meet design tolerances 370, then design 360 may be finalized and used to manufacture bearing housing 310.

In these illustrative examples, design 360 may be used with manufacturing process 376 to manufacture bearing housing 310. Manufacturing process 376 may be implemented using a number of different processes. For example, without limitation, manufacturing process 376 may be electrohydraulic forming, electromagnetic forming, explosive forming, extrusion, hydroforming, roll forming, superplastic forming, shear forming, hammer forging, induction forging, die forging, net shape forging or near net shape forging, roll forging, precision hot forging, precision composite forging, swaging, cogging, open-die forging, impression-die forging, press forging, automatic hot forging and upsetting, metal casting, sand casting, investment casting, die casting, computer numerical controlled machining, and/or high pressure die casting.

The illustration of bearing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional shafts and bearing systems may be located in additional engines for aircraft 304. In some advantageous embodiments, an additional bearing housing, in addition to bearing housing 310, may be present to provide further support for shaft 314.

Figure 4:
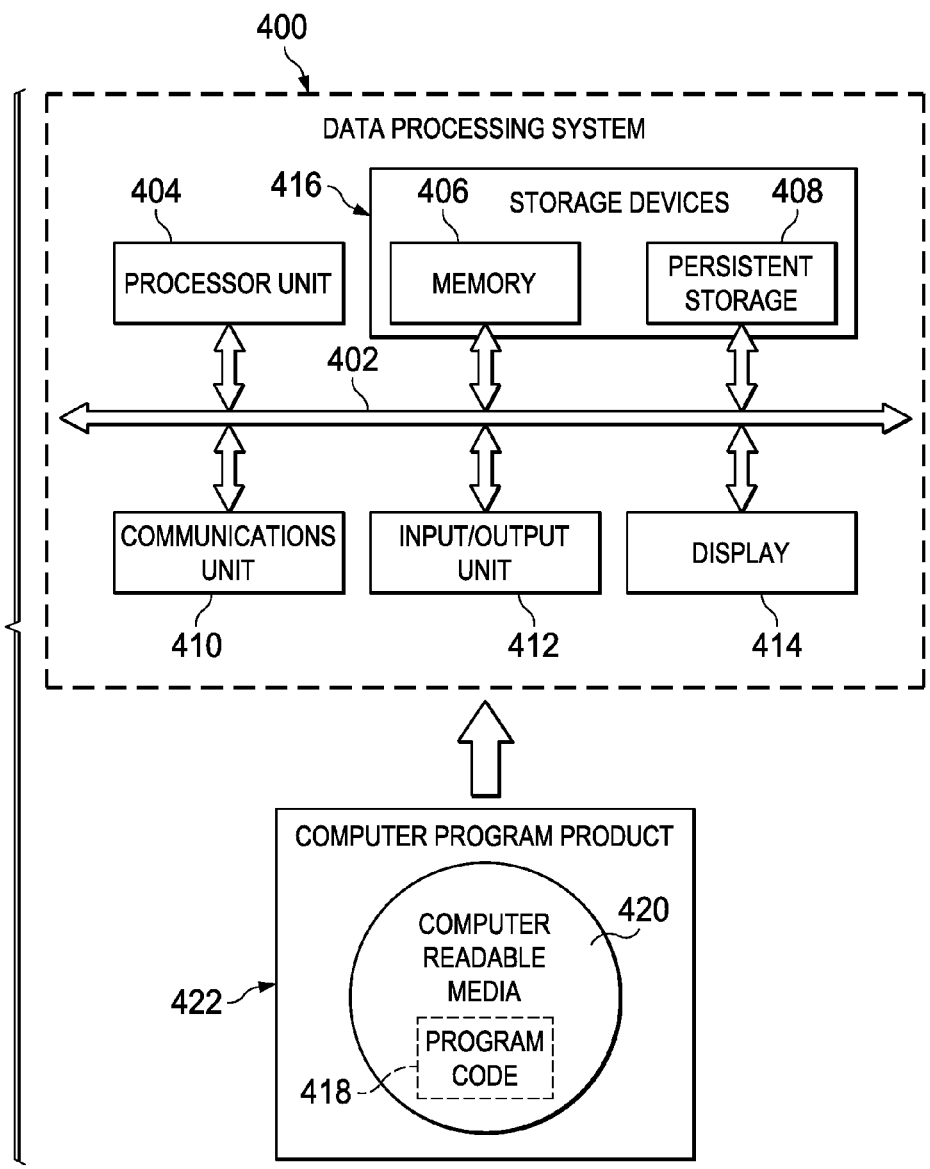
FIG. 4 is a diagram of a data processing system in accordance with an advantageous embodiment.

Turning now to FIG. 4, a diagram of a data processing system is depicted in accordance with an advantageous embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information such as, for example, without limitation, data, program code in functional form, and/or other suitable information either on a temporary basis and/or a permanent basis. Memory 406, in these examples, may be, for example, a random access memory or any other suitable volatile or non-volatile storage device.

Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be in a tangible form such as, for example, an optical or magnetic disk that is inserted or placed into a drive or other device that is part of persistent storage 408 for transfer onto a storage device, such as a hard drive, that is part of persistent storage 408.

In a tangible form, computer readable media 420 also may take the form of a persistent storage, such as a hard drive, a thumb drive, or a flash memory that is connected to data processing system 400. The tangible form of computer readable media 420 is also referred to as computer recordable storage media. In some instances, computer readable media 420 may not be removable.

Alternatively, program code 418 may be transferred to data processing system 400 from computer readable media 420 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 418 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
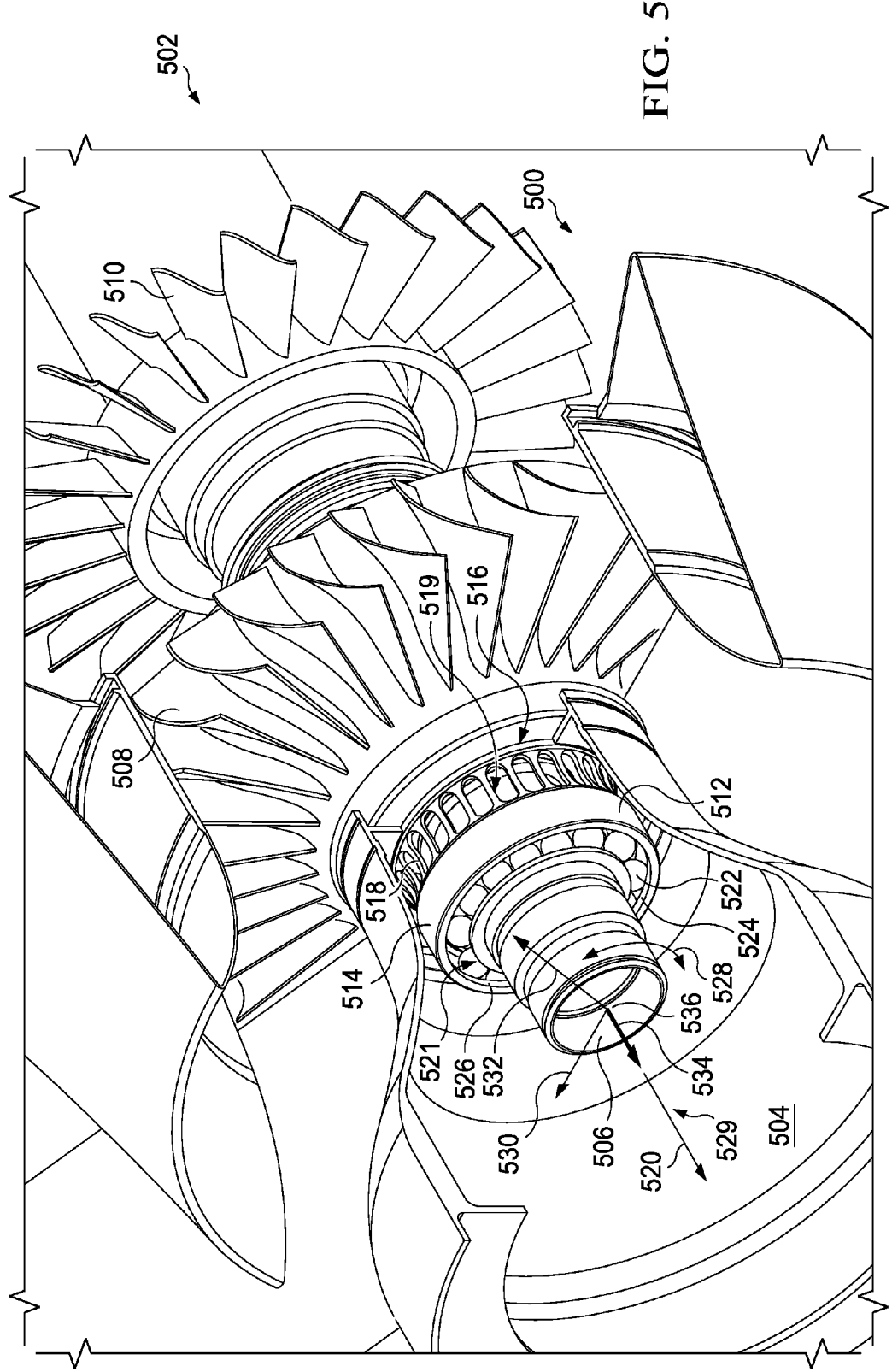
FIG. 5 is a diagram illustrating a bearing environment in accordance with an advantageous embodiment.

With reference now to FIG. 5, a diagram illustrating a bearing environment is depicted in accordance with an advantageous embodiment. In this illustrative example, bearing environment 500 is an example of one implementation for bearing environment 300 in FIG. 3. As depicted, bearing environment 500 includes engine 502.

Engine 502 is shown in an exposed view in this illustrative example. Engine 502 includes case 504, shaft 506, compressor stage 508, compressor stage 510, and bearing housing 512. In this example, bearing housing 512 is attached to case 504. Compressor stage 508 and compressor stage 510 are rotatably mounted on shaft 506.

As illustrated, bearing housing 512 comprises bearing section 514, base 516, and plurality of members 518. Each of plurality of members 518 has a side that is substantially non-perpendicular with respect to the bearing section 514 and the base 516. In this illustrative example, plurality of members 518 has curve 519. In this illustrative example, curve 519 for plurality of members 518 are curved inwards toward axis 520.

Base 516 is attached to compressor stage 508 in this illustrative example. Shaft 506 may rotate within bearing housing 512 about axis 520. Axis 520 extends through bearing housing 512 in this illustrative example. Bearing section 514 and base 516 have a cylindrical shape that is substantially aligned with axis 520.

In these illustrative examples, bearings 521 are located between bearing housing 512 and shaft 506. Bearings 521 take the form of balls 522 in this illustrative example. Bearings 521 may be located in channel 524 in bearing section 514 and channel 526 on shaft 506 in these illustrative examples. The configuration of plurality of members 518 provide a capability for bearing housing 512 to have a desired amount of rigidity, while reducing the amount of stress applied to plurality of members 518 to a desired level.

In these illustrative examples, the rigidity is with respect to rotational forces caused by rotation of shaft 506 in the direction of arrow 528. The rotation of shaft 506 may cause forces 529. Forces 529 may include, for example, without limitation, gyroscopic force 530, unbalance force 532, and/or thrust force 534 to be applied to bearing housing 512. Gyroscopic force 530 is a side force applied to bearing housing 512 in the direction opposite to the direction of the maneuvering of an aircraft, such as aircraft 304 in FIG. 3.

Unbalance force 532 is a force applied radially outwards from center 536 of shaft 506. Thrust force 534 is an axial force in the forward direction of axis 520. Thrust force 534 is the summation of all of the pressure forces acting on shaft 506. In the illustrative examples, these forces may be forces acting on airfoils associated with and/or connected directly or indirectly to the shaft.

Figure 6:
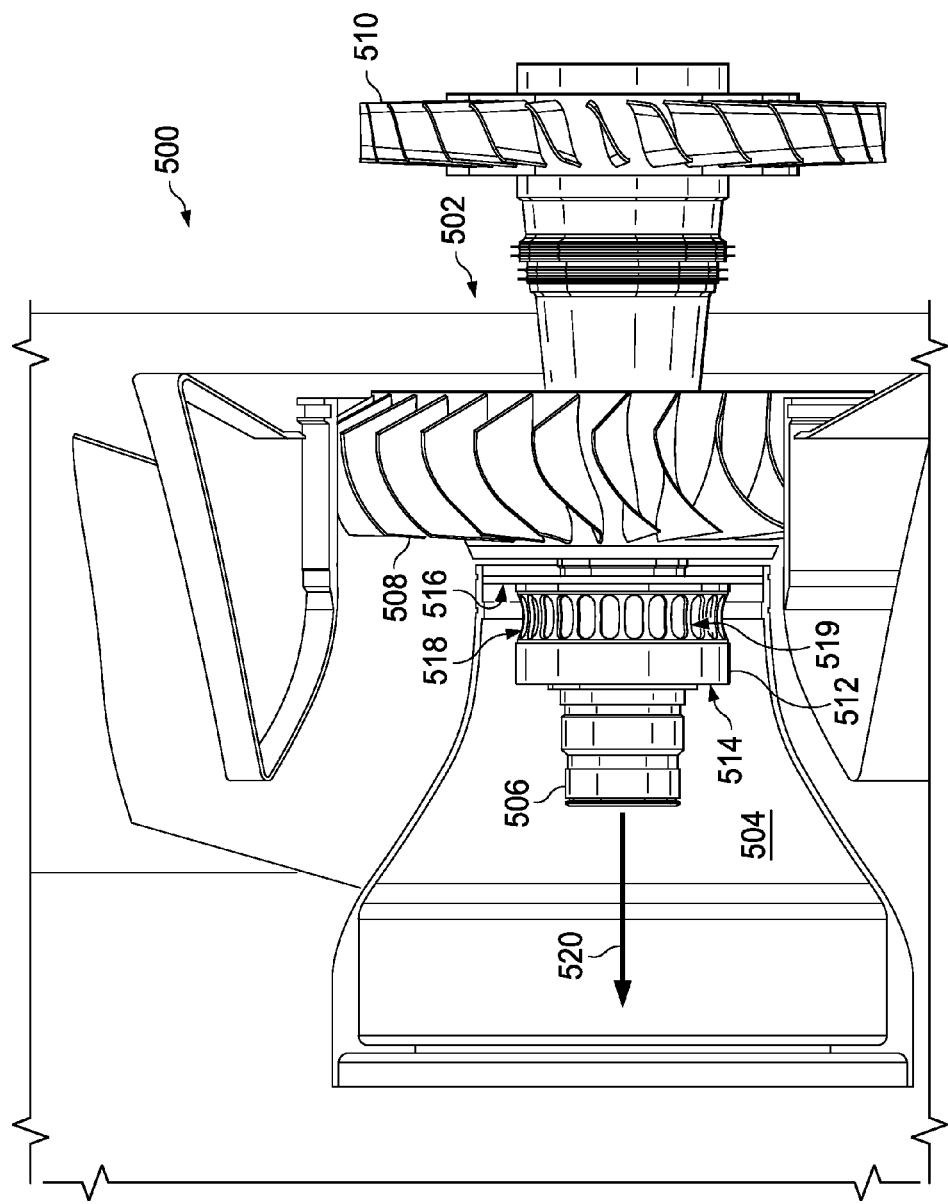
FIG. 6 is a diagram illustrating a side view of a bearing environment in accordance with an advantageous embodiment.

With reference now to FIG. 6, a diagram illustrating a side view of a bearing environment is depicted in accordance with an advantageous embodiment. In this view, bearing environment 300 is shown in a side-exposed view. In this illustrative example, curve 519 for plurality of members 518 is inward towards axis 520.

Figure 7:
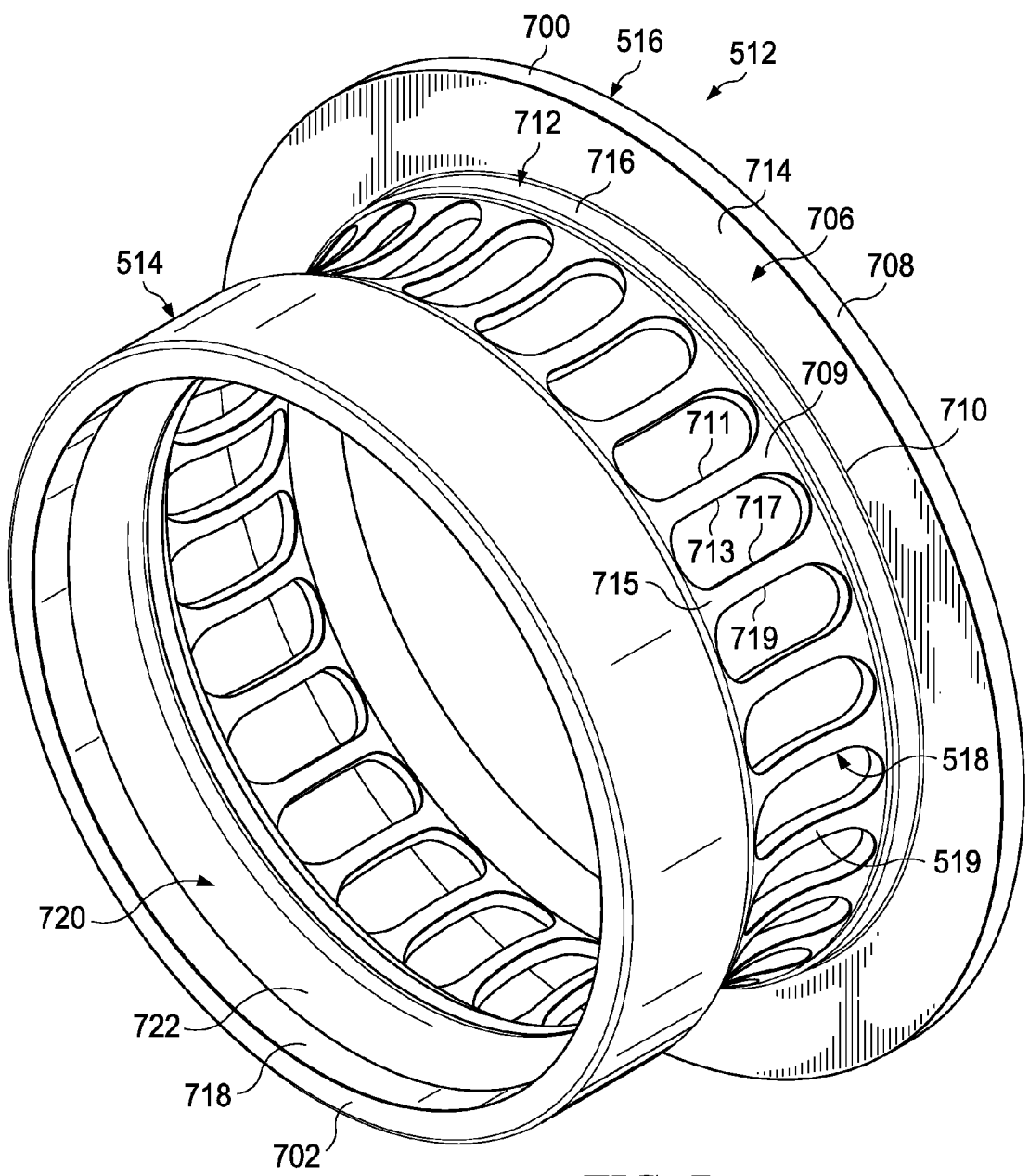
FIG. 7 is a diagram of a bearing housing in accordance with an advantageous embodiment.

With reference now to FIG. 7, a diagram of a bearing housing is depicted in accordance with an advantageous embodiment. In this example, bearing housing 512 is illustrated in a perspective view. As can be seen in this view, base 516 has cylindrical shape 700. Bearing section 514 also has cylindrical shape 702. Base 516 has ring 706 with outer edge 708 and inner edge 710. Flange 712 extends substantially perpendicular from surface 714 of ring 706 on inner edge 716 of base 516. In this illustrative example, plurality of members 518 extend between flange 712 on base 516 and bearing section 514.

In this illustrative example, plurality of members 518 do not extend in a substantially perpendicular manner as with currently available bearings. More specifically, each of plurality of members 518 has a side that is substantially non-perpendicular with respect to bearing section 514 and base 516. For example, member 709 has sides 711 and 713. Member 715 has sides 717 and 719. Side 713 is substantially opposite side 717. In this illustrative example, plurality of members 518 and their sides have curve 519.

As can be seen in this illustrative example, bearing section 514 has ring 718 with channel 720 extending around inner surface 722 of bearing section 514. Channel 720 may be capable of receiving bearings to support rotation of a shaft.

Figure 8:
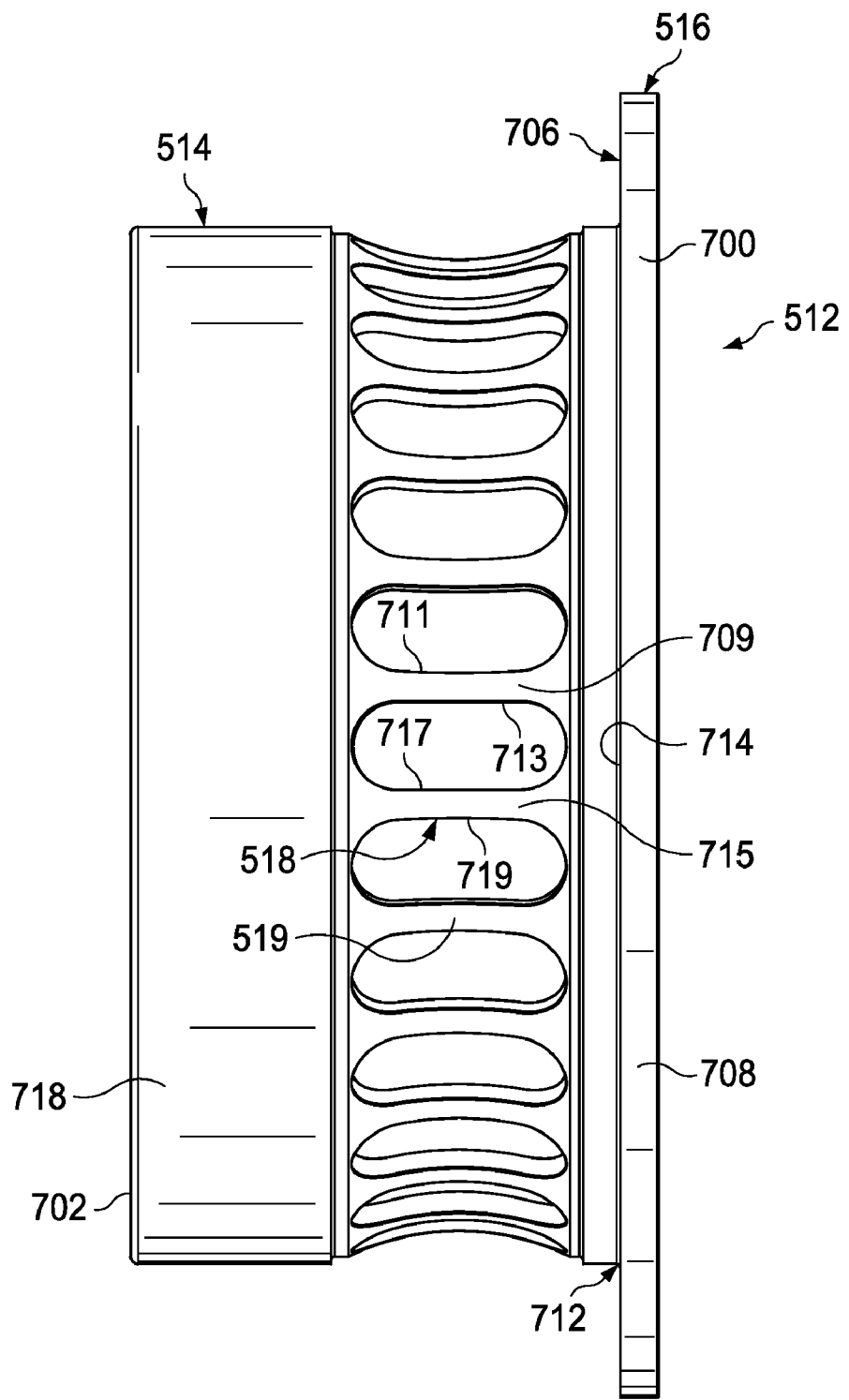
FIG. 8 is a side view of a bearing housing in accordance with an advantageous embodiment.

Turning now to FIG. 8, a side view of a bearing housing is depicted in accordance with an advantageous embodiment. In this illustration, bearing housing 512 is depicted in a side view to provide another view of curve 519 for plurality of members 518. Curve 519 is selected to provide a desired amount of stress for plurality of members 518 when bearing housing 512 has a desired amount of stiffness.

Figure 9:
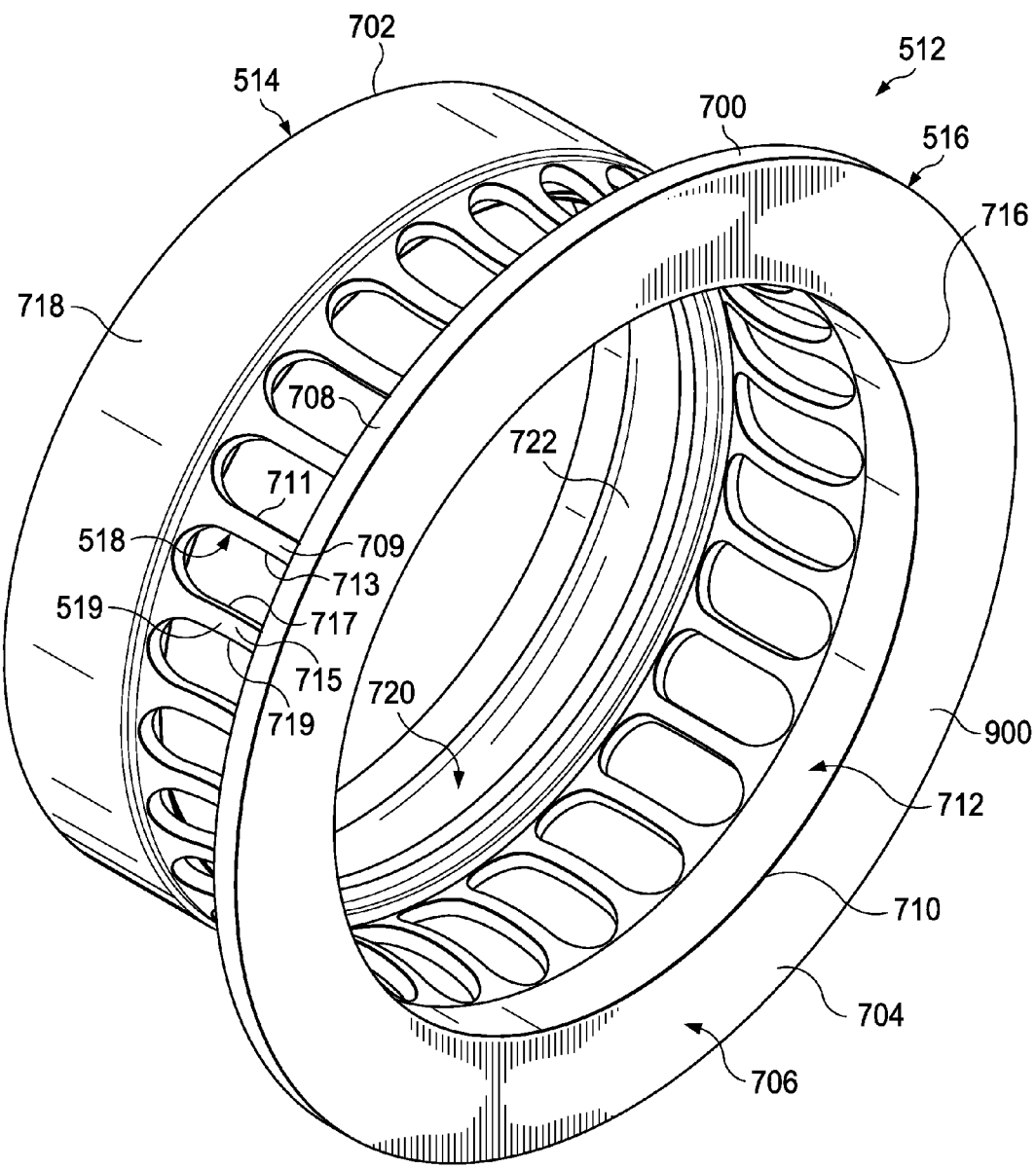
FIG. 9 is a perspective view of a bearing housing in accordance with an advantageous embodiment.

With reference now to FIG. 9, a perspective view of a bearing housing is depicted in accordance with an advantageous embodiment. In this example, bearing housing 512 is depicted such that surface 900 of ring 706 can be seen. Surface 900 is substantially opposite to surface 714 (not shown) of ring 706.

Figure 10:
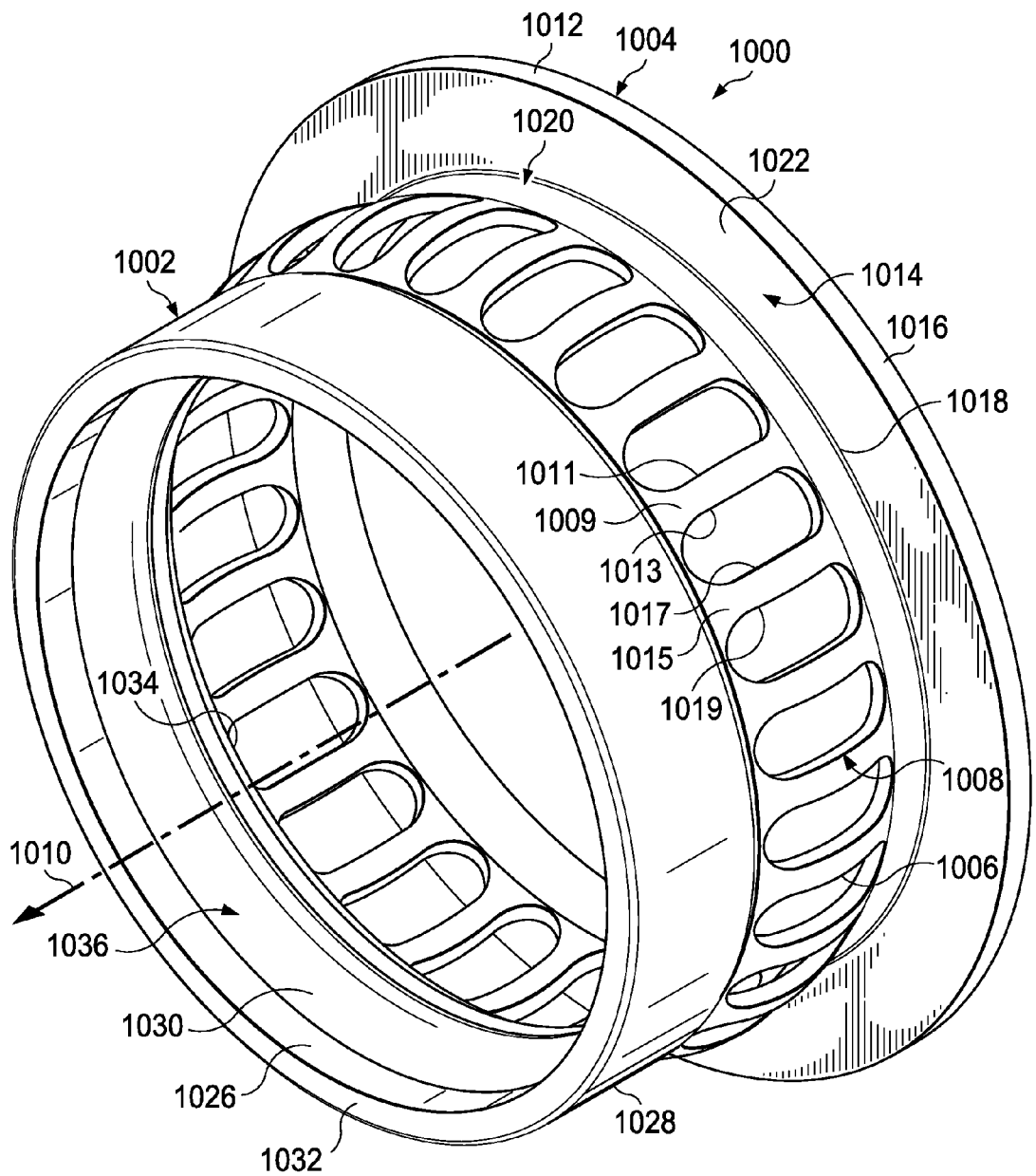
FIG. 10 is a diagram of a bearing housing having curved members in accordance with an advantageous embodiment.

With reference now to FIG. 10, a diagram of a bearing housing having curved members is depicted in accordance with an advantageous embodiment. Bearing housing 1000 is illustrated in a perspective view. In this illustrative example, bearing housing 1000 is an example of one implementation for bearing housing 310 in FIG. 3. Bearing housing 1000 may be used in place of bearing housing 512 in FIG. 5.

Bearing housing 1000 includes bearing section 1002, base 1004, and plurality of members 1006. In this illustrative example, plurality of members 1006 is arranged around axis 1010. Axis 1010 is located centrally with respect to plurality of members 1006.

Each of plurality of members 1006 has a side that is substantially non-perpendicular with respect to bearing section 1002 and base 1004. For example, member 1009 has sides 1011 and 1013. Member 1015 has sides 1017 and 1019. Side 1013 is substantially opposite side 1017. In this illustrative example, plurality of members 518 and their sides have curve 1008. Curve 1008 for plurality of members 1006 curves outwards away from axis 1010 in this illustrative example.

Base 1004 has ring 1014 with outer edge 1016 and inner edge 1018. Flange 1020 extends substantially perpendicular from surface 1022 at around inner edge 1016.

In this illustrative example, base 1004 has cylindrical shape 1012. Bearing section 1002 comprises ring 1026, which has outer surface 1028 and inner surface 1030. Additionally, ring 1026 has edge 1032 and edge 1034. Edge 1032 is the part of ring 1026 from which plurality of members 1006 extend. Further, inner surface 1030 has channel 1036. Channel 1036 is configured to be capable of receiving bearings.

Figure 11:
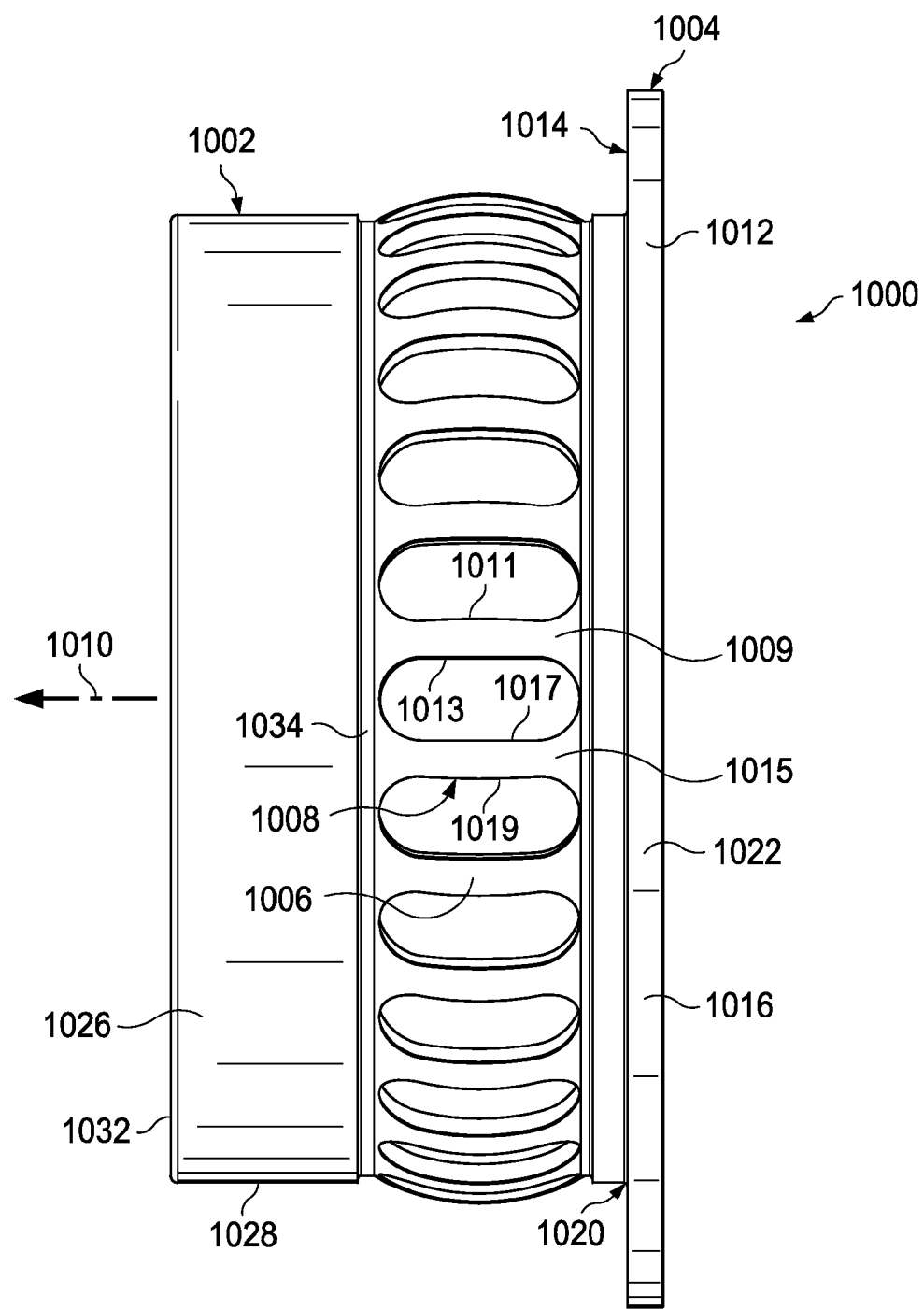
FIG. 11 is a side view of a bearing housing in accordance with an advantageous embodiment.

With reference next to FIG. 11, a side view of a bearing housing is depicted in accordance with an advantageous embodiment. Bearing housing 1000 is shown in a side view in this example to provide another perspective of curve 1008 in plurality of members 1006.

Figure 12:
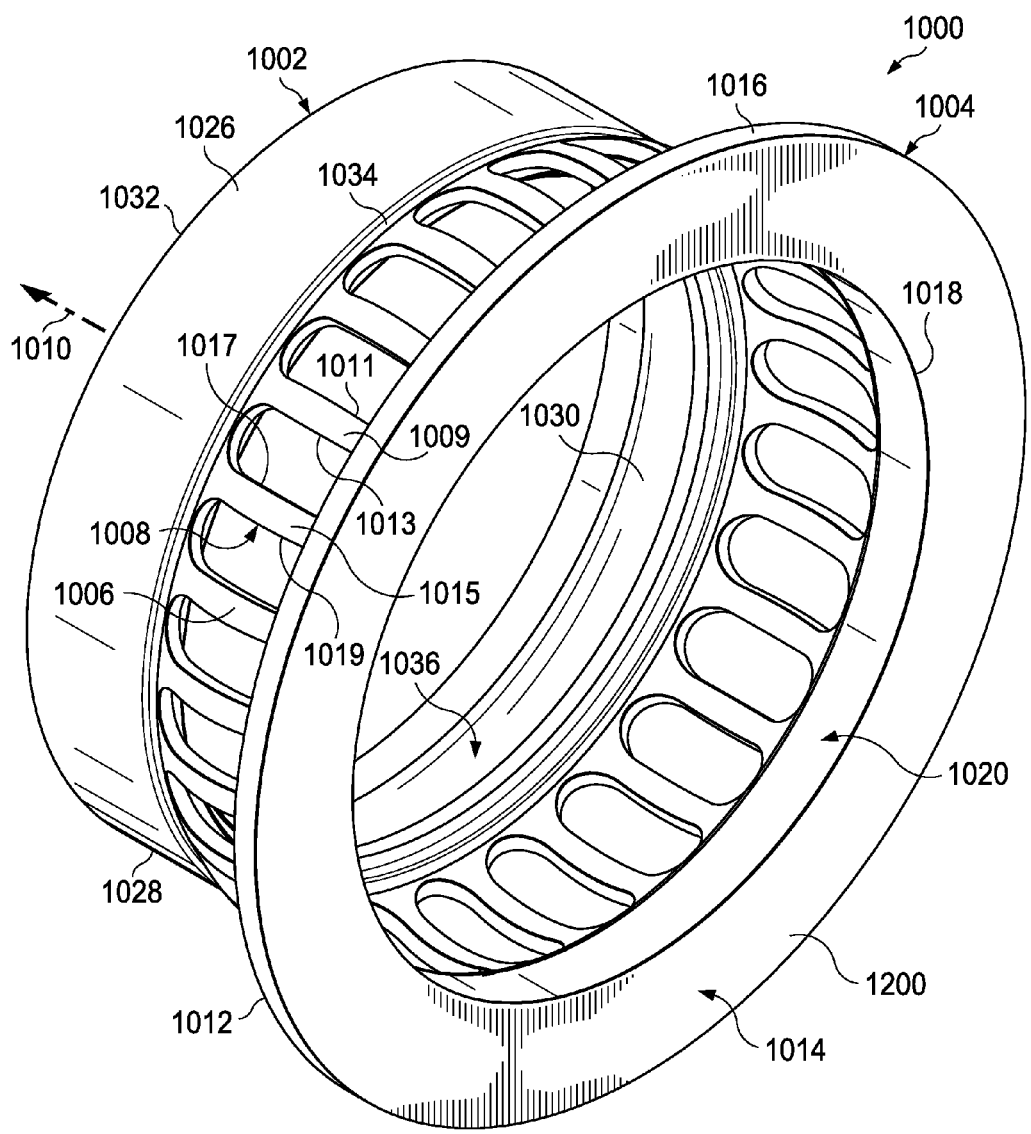
FIG. 12 is another perspective view of a bearing housing in accordance with an advantageous embodiment.

Turning next to FIG. 12, another perspective view of a bearing housing is depicted in accordance with an advantageous embodiment. In this illustrative example, the perspective view of bearing housing 1000 illustrates surface 1200 of ring 1014 for base 1004. Surface 1200 is substantially opposite of surface 1022 (not shown) for ring 1014.

Figure 13:
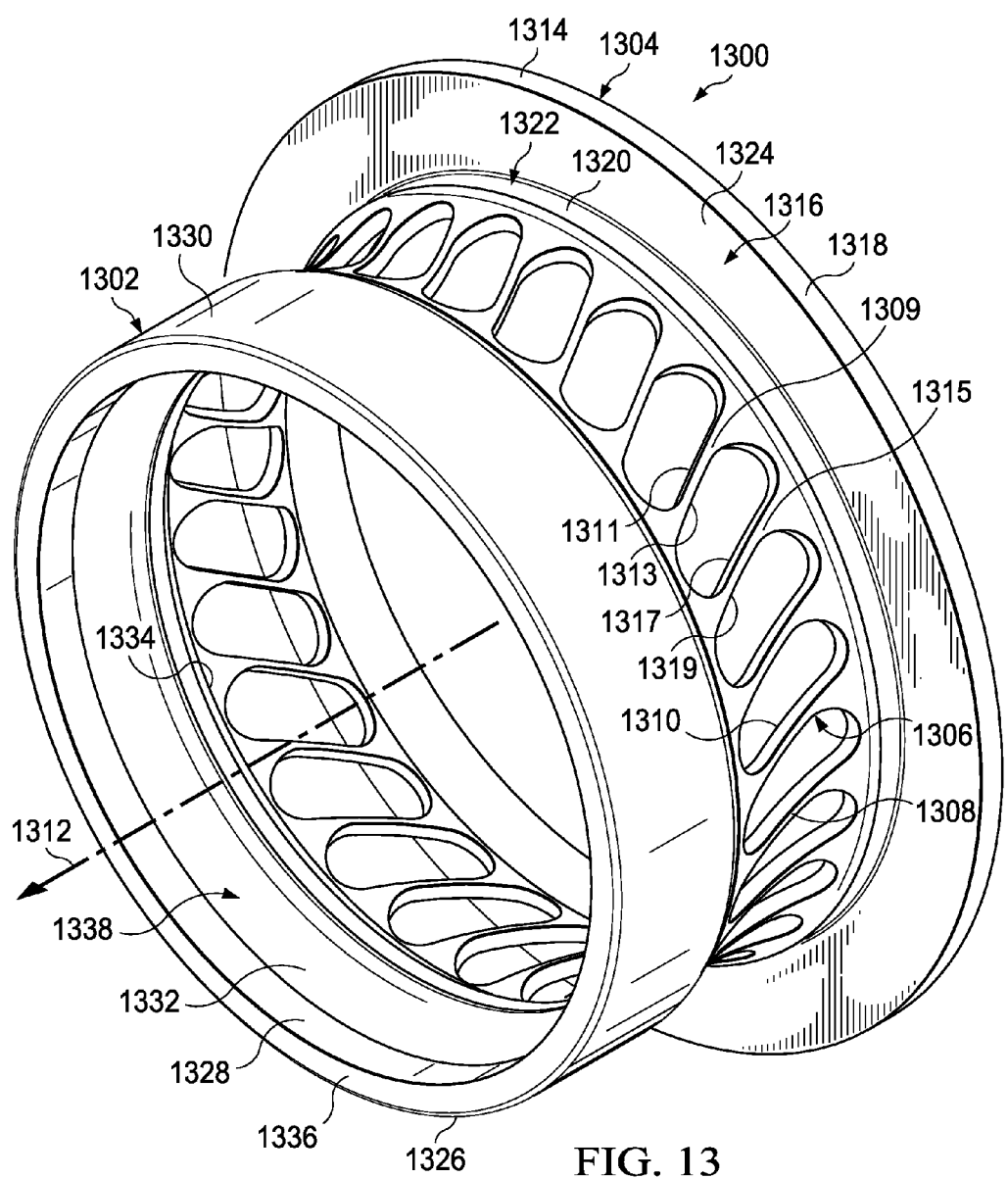
FIG. 13 is a diagram of a perspective view of a bearing housing in accordance with an advantageous embodiment.

With reference now to FIG. 13, a diagram of a perspective view of a bearing housing is depicted in accordance with an advantageous embodiment. Bearing housing 1300 is shown in a perspective view and may be one example of an implementation of bearing housing 310 in FIG. 3. Bearing housing 1300 may be used in place of bearing housing 512 in FIG. 5.

In this illustrative example, bearing housing 1300 has bearing section 1302, base 1304, and plurality of members 1306. Plurality of members 1306 extend between bearing section 1302 and base 1304 in bearing housing 1300. Each of plurality of members 1306 has a side that is substantially non-perpendicular with respect to bearing section 1302 and base 1304. For example, member 1309 has sides 1311 and 1313. Member 1315 has sides 1317 and 1319. Side 1313 is substantially opposite side 1317.

In the depicted example, plurality of members 1306 have curve 1308 and angle 1310. Curve 1308 for plurality of members 1306 is relative to axis 1312. In this illustrative example, curve 1308 is inward towards axis 1312. Angle 1310 is an angle from bearing section 1302 to base 1304. This angle is around 34 degrees in this illustrative example. In other examples, angle 1310 may be, for example, without limitation, an angle from around 10 degrees to around 45 degrees. Of course, angle 1310 may vary, depending on the particular implementation.

In this illustrative example, base 1304 has cylindrical shape 1314. Base 1304 comprises ring 1316, which has outer edge 1318 and inner edge 1320. Further, flange 1322 extends from surface 1324 around inner edge 1320 of ring 1316. Bearing section 1302 also has cylindrical shape 1326. Bearing section 1302 comprises ring 1328. Ring 1328 has outer surface 1330 and inner surface 1332.

Further, ring 1328 also has edge 1334 and edge 1336. Edge 1334 is the portion of bearing section 1302 from which plurality of members 1306 extend to base 1304. Angle 1310 also may change as plurality of members 1306 extend from bearing section 1302 to base 1304. Channel 1338 is located on inner surface 1332 of ring 1328. Channel 1338 is configured to be capable of receiving bearings.

Figure 14:
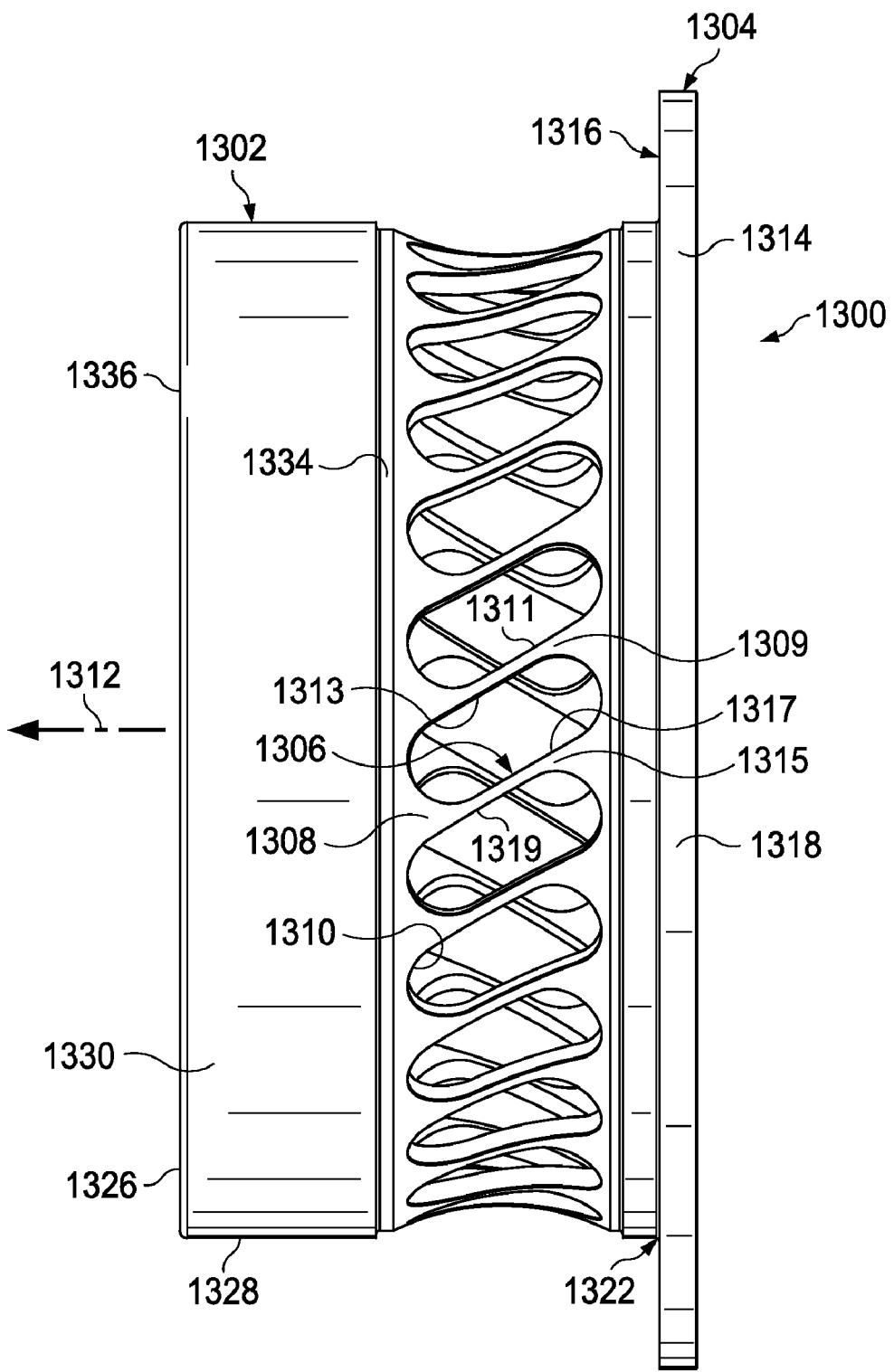
FIG. 14 is a side view of a bearing housing in accordance with an advantageous embodiment.

Turning now to FIG. 14, a side view of a bearing housing is depicted in accordance with an advantageous embodiment. In this illustrative example, angle 1310 for bearing housing 1300 may be seen more clearly in this side view of bearing housing 1300.

Figure 15:
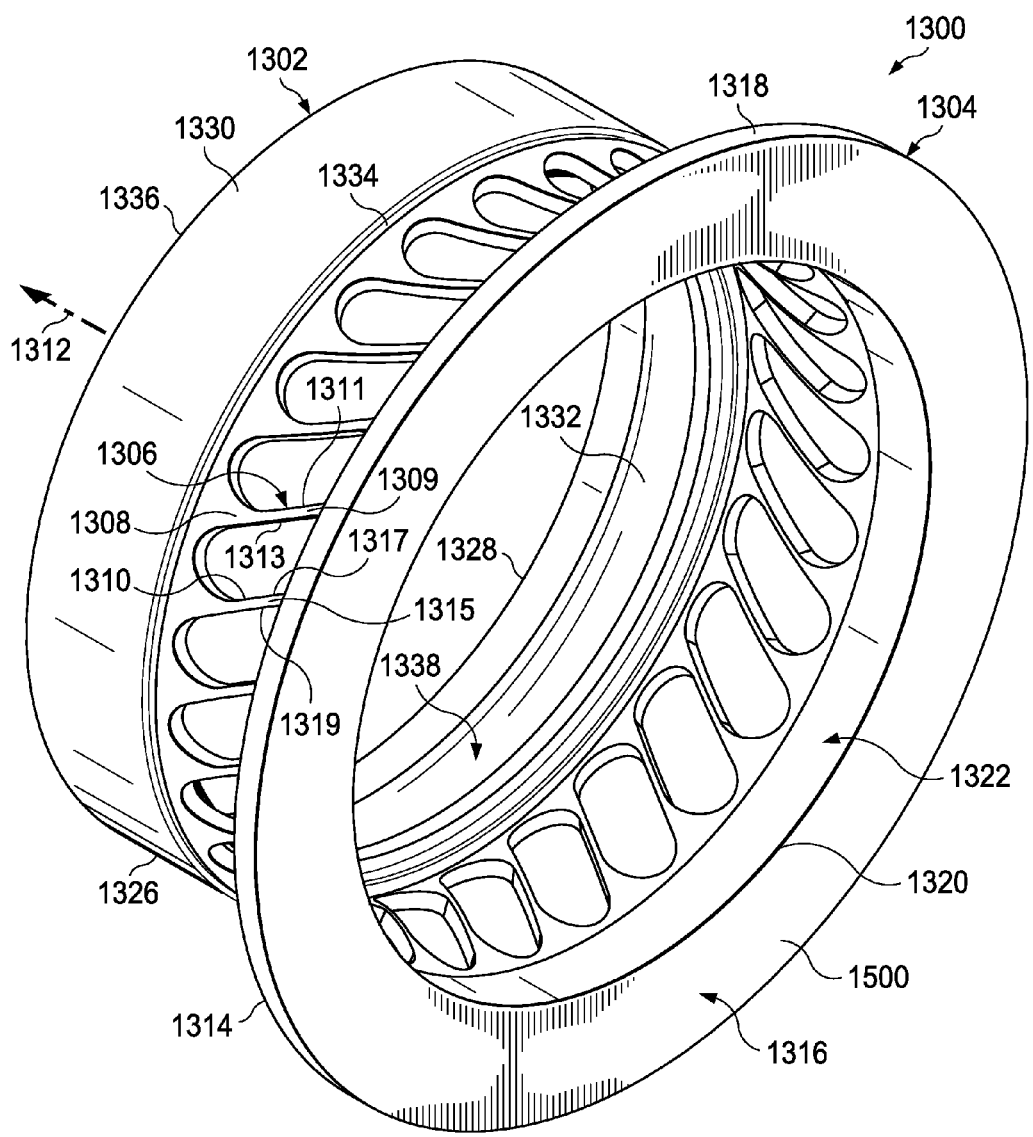
FIG. 15 is another view of a bearing housing in accordance with an advantageous embodiment.

With reference now to FIG. 15, another view of a bearing housing is depicted in accordance with an advantageous embodiment. In this illustrative example, surface 1500 of ring 1316 is depicted. Surface 1500 is substantially opposite of surface 1324 for ring 1316.

Figure 16:
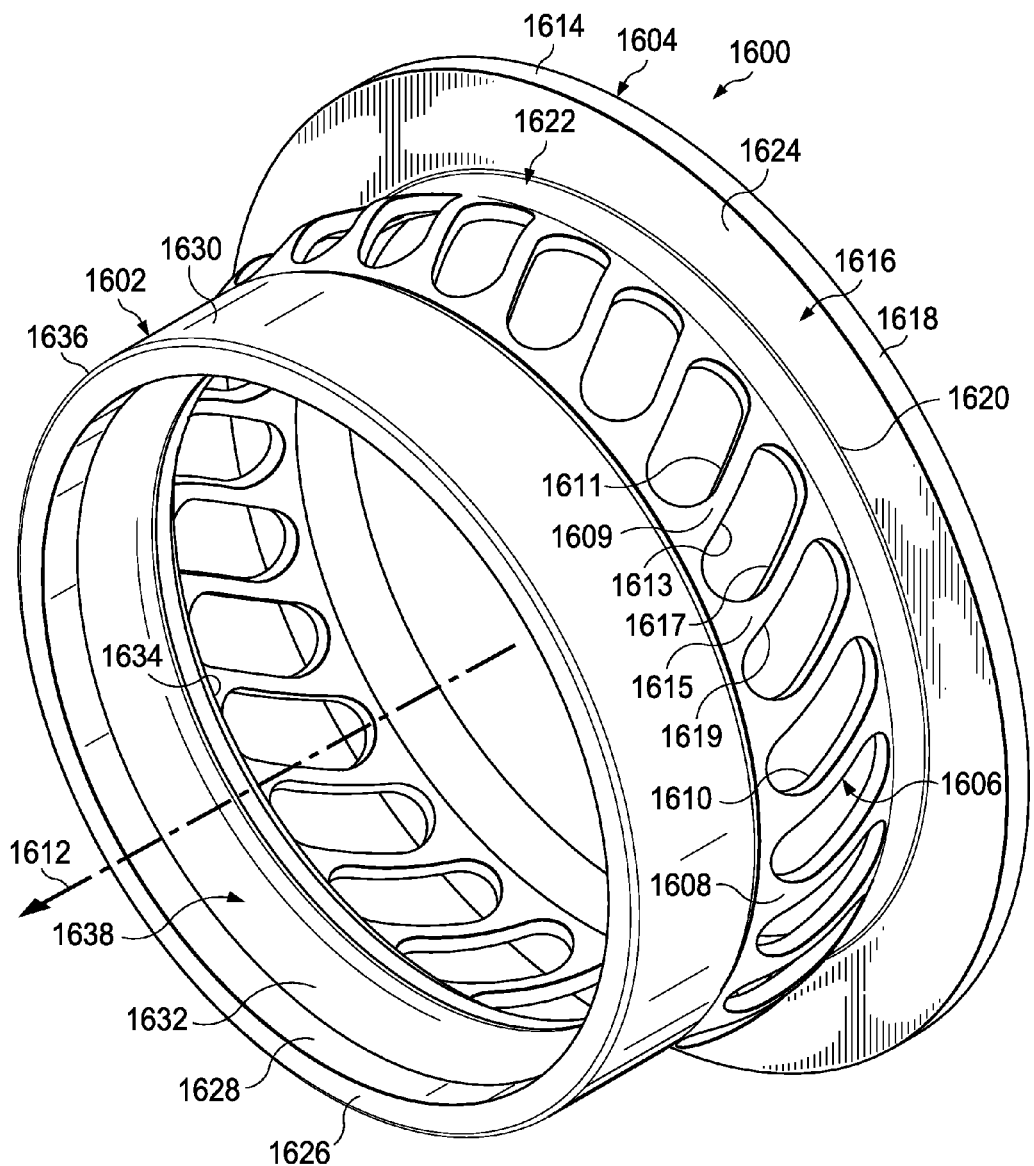
FIG. 16 is a diagram of a bearing housing in accordance with an advantageous embodiment.

With reference now to FIG. 16, a diagram of a bearing housing is depicted in accordance with an advantageous embodiment. Bearing housing 1600 is an example of yet another implementation for bearing housing 310 in FIG. 3. Bearing housing 1600 may replace bearing housing 512 in FIG. 5.

Bearing housing 1600 has bearing section 1602, base 1604, and plurality of members 1606. Plurality of members 1606 extend between bearing section 1602 and base 1604. Each of plurality of members 1606 has a side that is substantially non-perpendicular with respect to bearing section 1602 and base 1604. For example, member 1609 has sides 1611 and 1613. Member 1615 has sides 1617 and 1619. Side 1613 is substantially opposite side 1617.

In this illustrative example, plurality of members 1606 have curve 1608 and angle 1610. Plurality of members 1606 are arranged around axis 1612. In this illustrative example, curve 1608 is an outward curve in which curve 1608 for plurality of members 1606 extend outward from axis 1612. Angle 1610 is an angle that plurality of members 1606 has along the length extending from bearing section 1602 to base 1604.

Base 1604 has cylindrical shape 1614. Base 1604 comprises ring 1616. Ring 1616 has outer edge 1618 and inner edge 1620. Flange 1622 extends from surface 1624 in a direction substantially perpendicular to surface 1624. Flange 1622 is located around inner edge 1620 in this illustrative example.

Bearing section 1602 also has cylindrical shape 1626. Bearing section 1602 comprises ring 1628 having outer surface 1630 and inner surface 1632. Ring 1628 also has edge 1634 and edge 1636. Edge 1634 is the edge from which plurality of members 1606 extend in this illustrative example. Further, inner surface 1632 has channel 1638. Channel 1638 is configured to be capable of receiving bearings.

Figure 17:
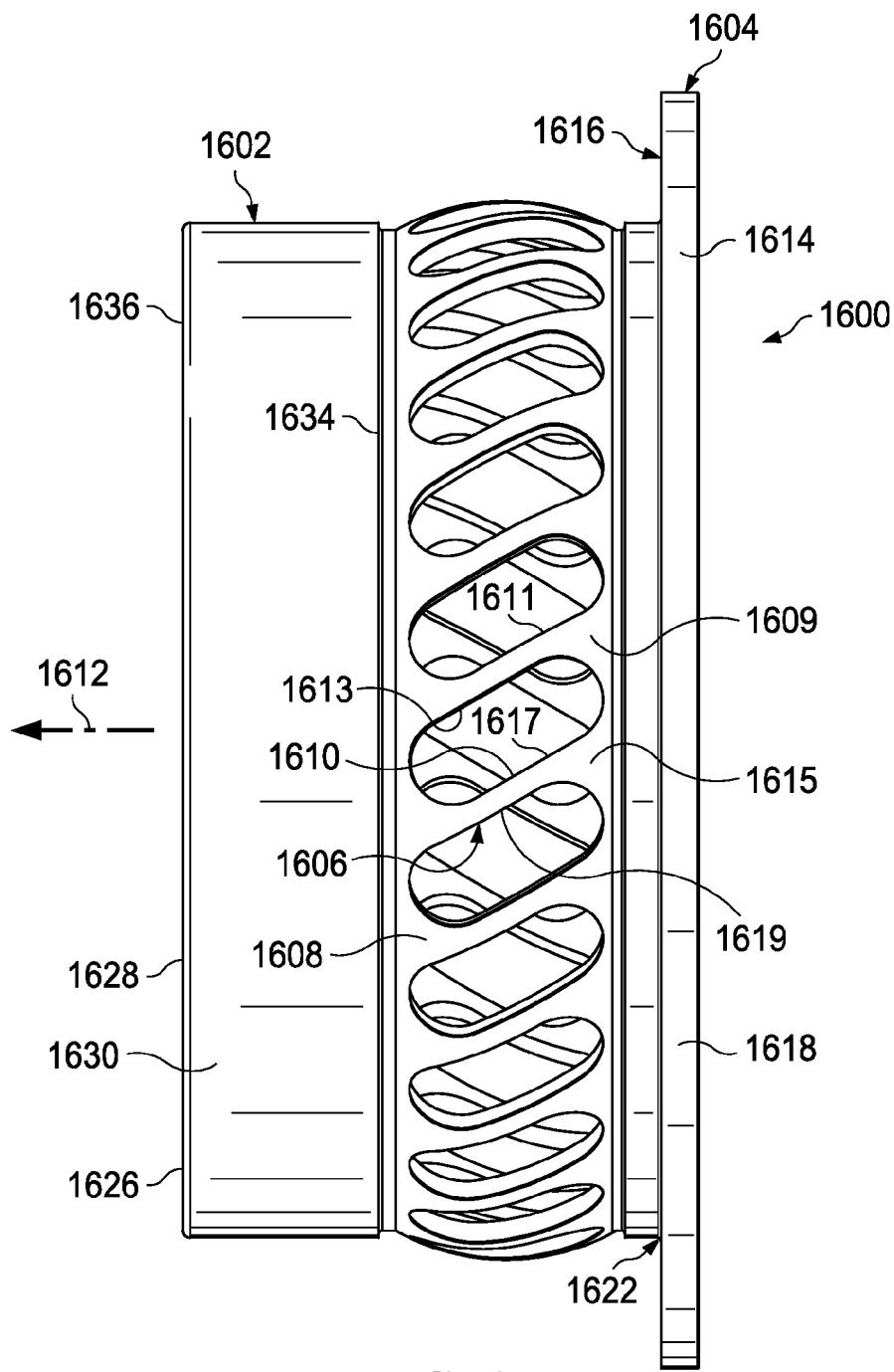
FIG. 17 is a diagram of a bearing housing in accordance with an advantageous embodiment.

Turning now to FIG. 17, a diagram of a bearing housing is depicted in accordance with an advantageous embodiment. In this illustrative example, bearing housing 1600 is shown in a side view to provide another view of curve 1608 and angle 1610 for plurality of members 1606.

Figure 18:
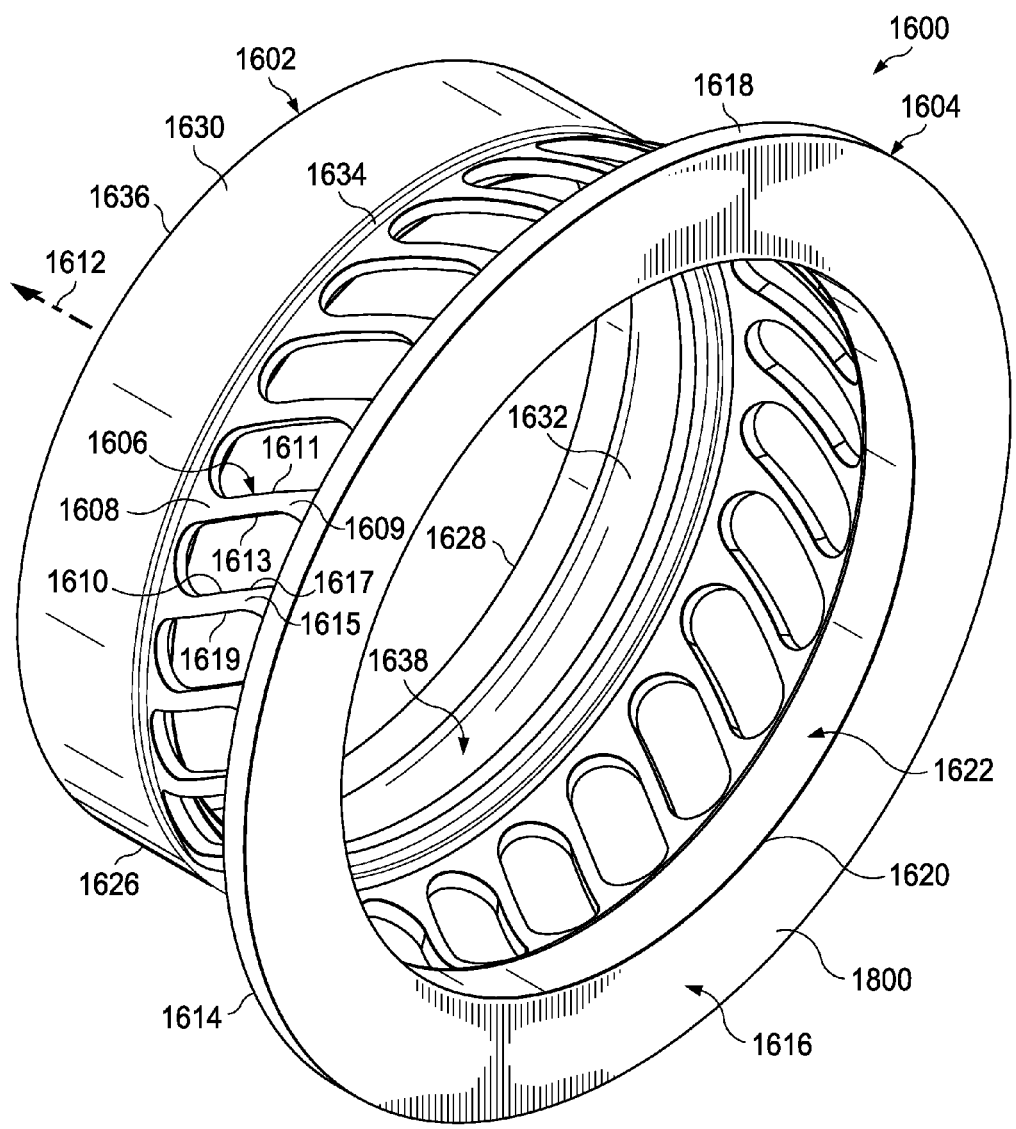
FIG. 18 is a perspective view of a bearing housing in accordance with an advantageous embodiment.

Turning now to FIG. 18, a perspective view of a bearing housing is depicted in accordance with an advantageous embodiment. In this view, surface 1800 of ring 1616 for base 1604 can be seen. Surface 1800 is substantially opposite of surface 1624 for ring 1616.

Figure 19:
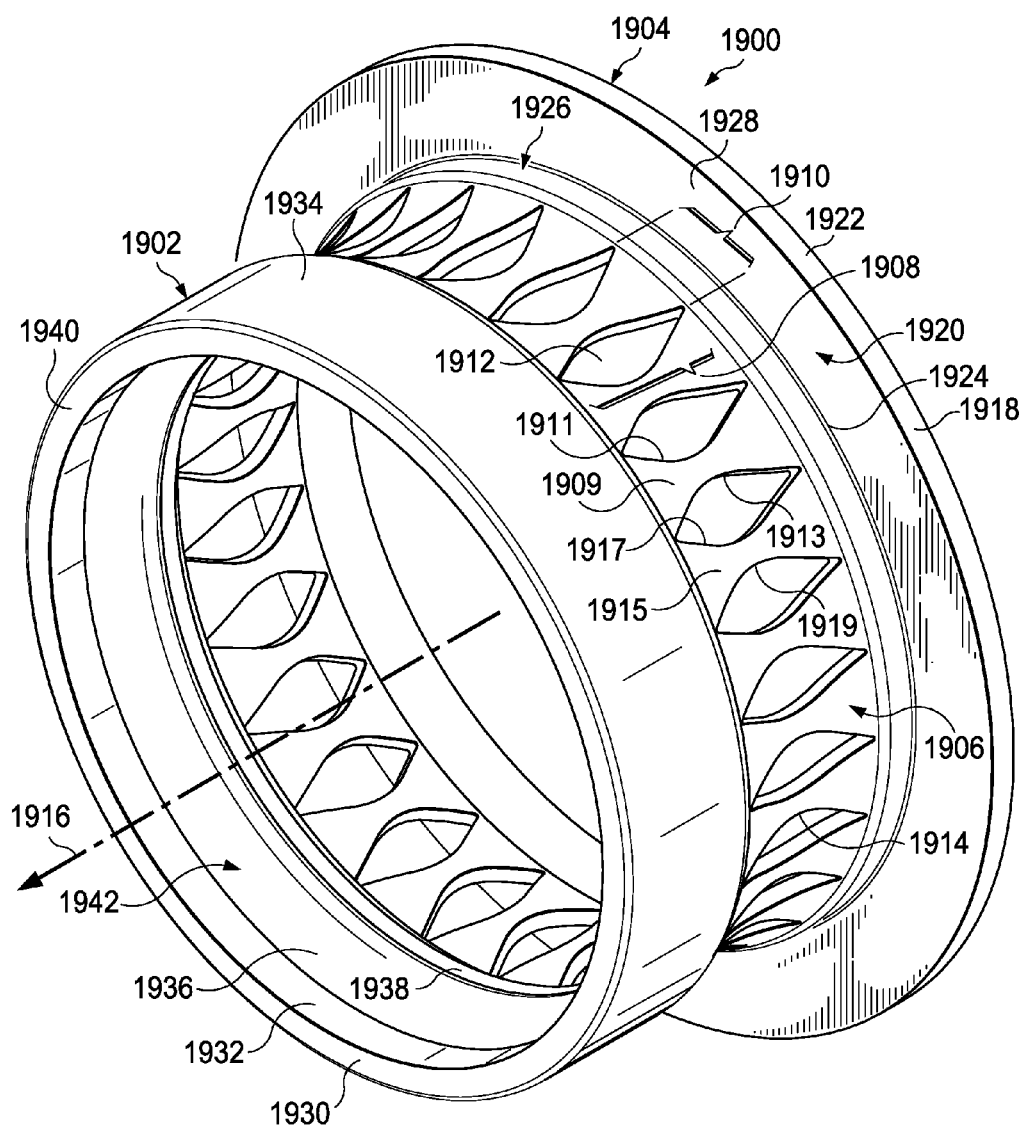
FIG. 19 is a diagram of a bearing housing in accordance with an advantageous embodiment.

With reference now to FIG. 19, a diagram of a bearing housing is depicted in accordance with an advantageous embodiment. Bearing housing 1900 is an example of an implementation of bearing housing 310 in FIG. 3. Bearing housing 1900 may be used in place of bearing housing 512 in FIG. 5.

In this illustrative example, bearing housing 1900 has bearing section 1902, base 1904, and plurality of members 1906. Plurality of members 1906 extend between bearing section 1902 and base 1904. In this illustrative example, plurality of members 1906 has length 1908 and width 1910. Width 1910 decreases as it approaches center 1912 of length 1908 and then again increases to form bowtie shape 1914. Further, each of plurality of members 1906 has a side that is substantially non-perpendicular with respect to bearing section 1902 and base 1904. For example, member 1909 has sides 1911 and 1913. Member 1915 has sides 1917 and 1919. Side 1913 is substantially opposite side 1917.

Plurality of members 1906 are arranged about axis 1916. Further, base 1904 has cylindrical shape 1918. Base 1904 has ring 1920 with outer edge 1922 and inner edge 1924. Flange 1926 extends from surface 1928. Flange 1926 extends in a direction substantially perpendicular to surface 1928 around inner edge 1924.

Bearing section 1902 also has cylindrical shape 1930. Bearing section 1902 is comprised of ring 1932 having outer surface 1934 and inner surface 1936. Additionally, ring 1932 has edge 1938 and edge 1940. Edge 1938 is the edge from which plurality of members 1906 extend toward base 1904. Channel 1942 is located on inner surface 1936.

Figure 20:
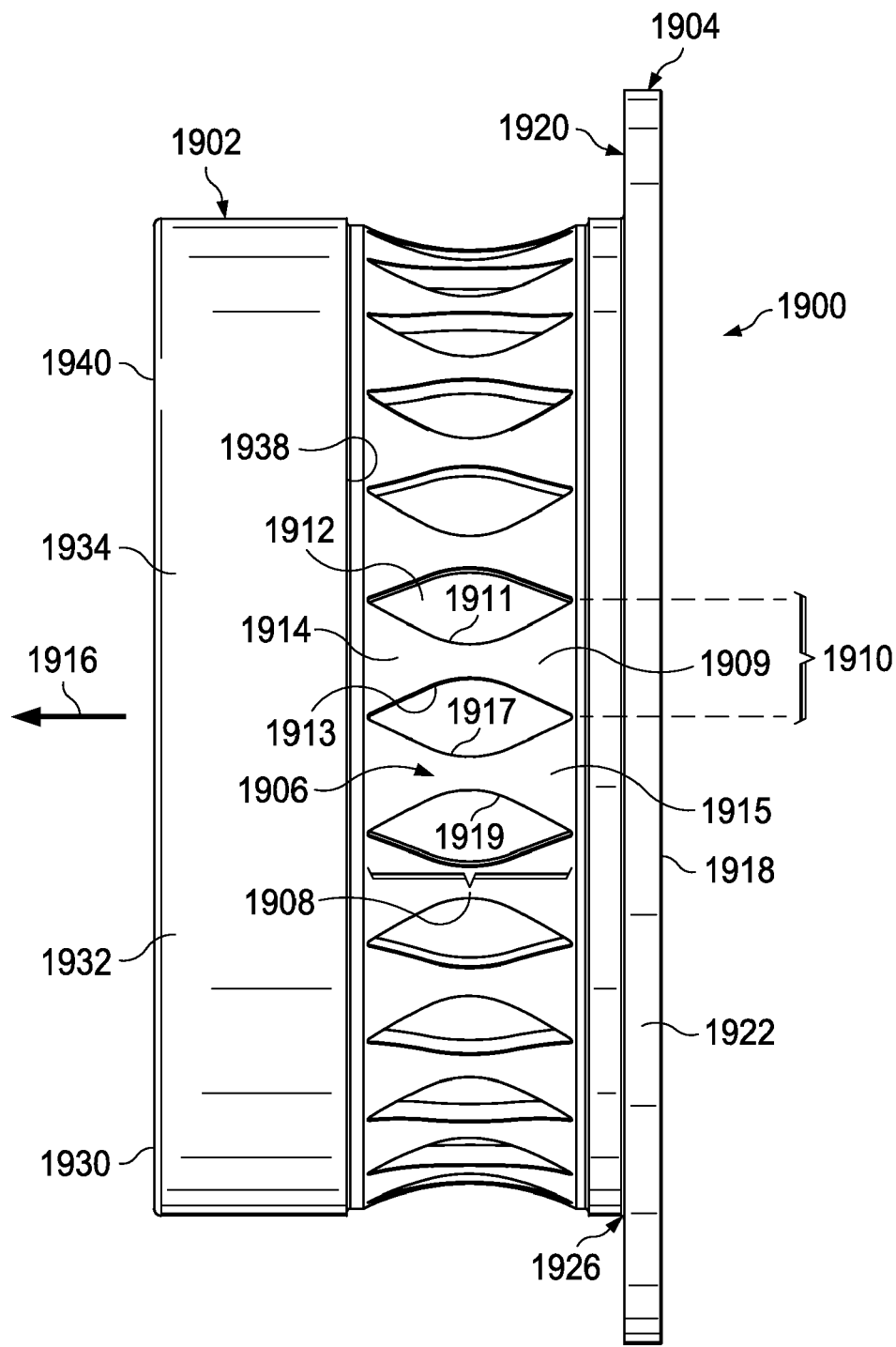
FIG. 20 is a diagram illustrating a bearing housing in accordance with an advantageous embodiment.

With reference now to FIG. 20, a diagram illustrating a bearing housing is depicted in accordance with an advantageous embodiment. In this illustrative example, a side view of bearing housing 1900 is illustrated to provide another view of bowtie shape 1914 for plurality of members 1906.

Figure 21:
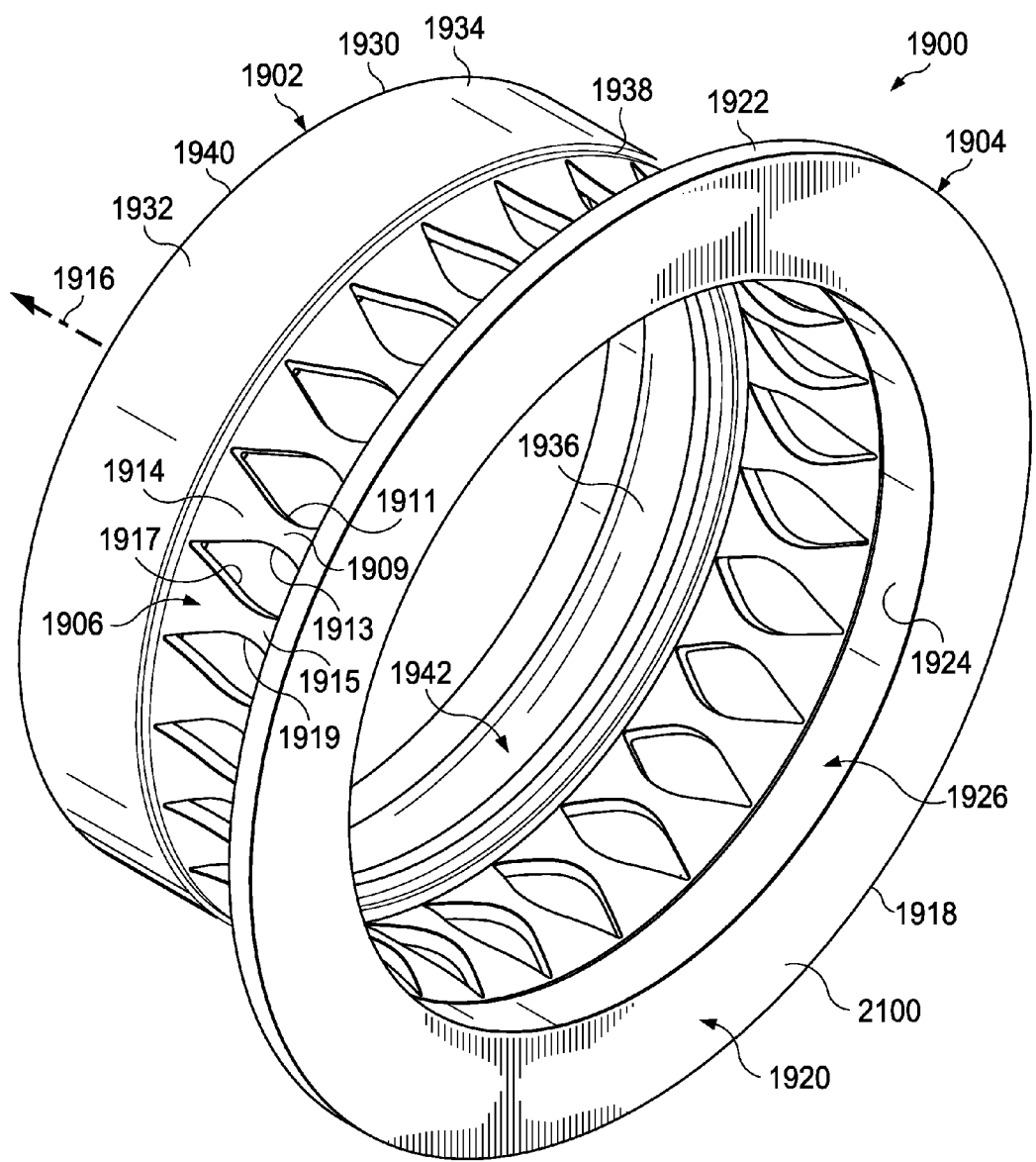
FIG. 21 is a perspective view of a bearing housing in accordance with an advantageous embodiment.

With reference now to FIG. 21, another perspective view of a bearing housing is depicted in accordance with an advantageous embodiment. In this illustrative example, bearing housing 1900 is shown in a view in which surface 2100 of ring 1932 in base 1904 can be seen.

The illustrations of the bearing housings in FIGS. 5-21 are not meant to imply physical or architectural limitations to the manner in which other bearing housings may be implemented. For example, in other advantageous embodiments, the base in the bearing housing may have a different configuration. For example, without limitation, the flange extending from the surface of the ring may extend around the middle of the ring rather than from the inner edge. In other advantageous embodiments, the flange may extend from the outer edge of the ring. Further, in other advantageous embodiments, bearing section 1602 may have additional channels in addition to channel 1638 configured to receive additional bearings.

Figure 22:
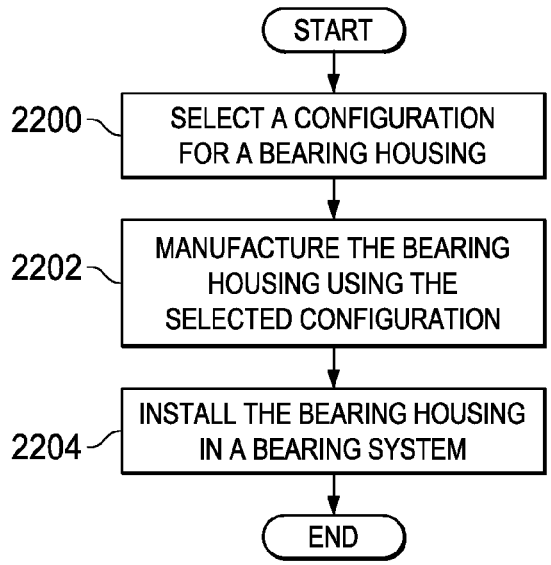
FIG. 22 is a flowchart of a process for manufacturing a bearing housing in accordance with an advantageous embodiment.

Turning now to FIG. 22, a flowchart of a process for manufacturing a bearing housing is depicted in accordance with an advantageous embodiment. The process illustrated in FIG. 22 may be implemented in bearing environment 300 to design and manufacture bearing housing 310 in FIG. 3.

The process begins by selecting a configuration for a bearing housing (operation 2200). In these illustrative examples, the bearing housing may include a bearing section, a base, and a plurality of members extending from the bearing section to the base. Further, the plurality of members may have a length and a width. The configuration selected for the bearing housing in operation 2200 may be one that is selected from at least one of the plurality of members extending from an angle in the bearing section to the base, the plurality of members having a curve relative to the axis, and the width of the plurality of members decreasing and increasing along the length of the plurality of members to form a bowtie shape.

The bearing housing may then be manufactured using the selected configuration (operation 2202). The selection of the configuration of a bearing housing in operation 2200 may be selected from a configuration that provides the desired amount of stiffness for the bearing housing as well as the amount of desired stress for the plurality of members in the bearing housing.

The bearing housing may then be installed in a bearing system (operation 2204), with the process terminating thereafter. This process may be used during the construction of a platform, such as an aircraft, as well as during repair and maintenance or upgrades for an aircraft.

Figure 23:
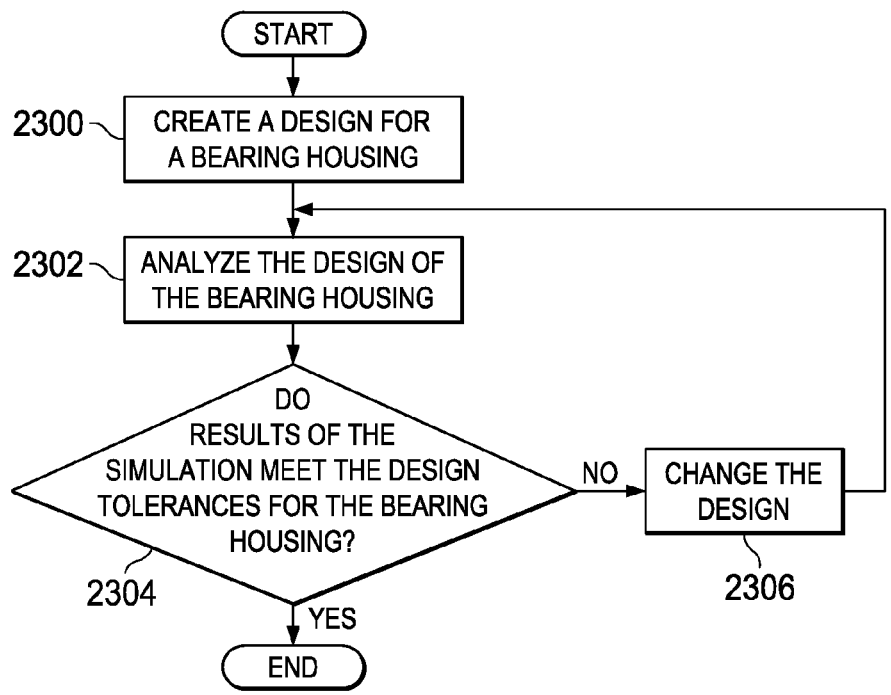
FIG. 23 is a flowchart of a process for designing a bearing housing in accordance with an advantageous embodiment.

With reference now to FIG. 23, a flowchart of a process for designing a bearing housing is depicted in accordance with an advantageous embodiment. The process illustrated in FIG. 23 may be implemented in bearing environment 300 in FIG. 3. In particular, the process may be implemented using at least one of design process 364 and simulation process 366.

The process begins by creating a design for the bearing housing (operation 2300). The design may include a number of different parameters for a bearing housing. These parameters may include, for example, without limitation, dimensions for various parts of the bearing housing, materials, and/or other suitable parameters. The parameters for the dimensions may include a configuration for the plurality of members. This configuration may be, for example, without limitation, selected from at least one of the plurality of members extending from an angle in the bearing section to the base, the plurality of members having a curve relative to the axis, and the width of the plurality of members decreasing and increasing along the length of the plurality of members to form a bowtie shape.

The process then analyzes the design of the bearing housing (operation 2302). This analysis may be performed using a number of different types of simulation processes. For example, without limitation, a finite element analysis program may be used to simulate the use of a bearing housing and identify various forces, stresses, loads, and/or other physical phenomena that may occur during a simulation.

After the analysis, a determination is made as to whether the results of the simulation meet the design tolerances for the bearing housing (operation 2304). In these examples, the different tolerances may include, for example, without limitation, the stiffness of the bearing housing and the stress on the bearing housing. The stiffness may be the stiffness with respect to rotational forces applied to the bearing housing during use. The stress may be the stress on the plurality of members. It is desirable to have the stress fall within the design tolerances to increase the life of the bearing housing. At the same time, a desired amount of stiffness is needed to provide the desired level of performance.

For example, the stiffness of the bearing housing influences the critical speed of the shaft. The critical speed of the shaft is the speed at which high amplitude vibrations of the rotating shaft occur. It is desirable to control the stiffness of the bearing housing in a manner that allows for control of the critical speed of the shaft. This control may increase the mechanical performance of the engine. For example, controlling the stiffness of the bearing housing may allow an operator to guide the critical speed of the shaft beyond a normal operating range.

If the results do not meet the design tolerances, the design is changed (operation 2306), and the process returns to operation 2302 to perform another simulation. Otherwise, if the results do meet the design tolerances, the process terminates.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for a bearing housing. In the different advantageous embodiments, the bearing housing may comprise a bearing section, a base, and a plurality of members extending between the bearing section and the base. The bearing section and the base both have a cylindrical shape and are substantially aligned centrally along an axis. The plurality of members may have a configuration selected from at least one of the plurality of members extending from an angle in the bearing section to the base, the plurality of members having a curve relative to the axis, and a width of the plurality of members decreasing and increasing along a length of the plurality of members to form a bowtie shape.

The description of the different advantageous embodiments has been presented for purposes of illustration and description, and it is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of platforms.

For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable platform.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a bearing housing, the method comprising:
    selecting a configuration for the bearing housing, wherein the bearing housing comprises a bearing section having a cylindrical shape and capable of receiving bearings; a base having the cylindrical shape, wherein the bearing section and the base are substantially aligned centrally along an axis; and a plurality of members extending between the bearing section and the base, wherein the plurality of members have a length and a width, and wherein, in the configuration, each of the plurality of members has a side that is substantially non-perpendicular with respect to the bearing section and the base, and further wherein the configuration for the bearing housing is selected from a number of configurations comprising at least one of the plurality of members extending at an angle from the bearing section to the base; the plurality of members having a curve relative to the axis; and the width of the plurality of members decreasing or increasing along the length of the plurality of members to form a bowtie shape; and
    manufacturing the bearing housing the configuration.

2. The method of claim 1 further comprising:
    creating a design for the bearing housing, wherein the design includes a proposed configuration for the bearing housing.

3. The method of claim 2 further comprising:
    analyzing the proposed configuration for the bearing housing;
    determining whether the proposed configuration for the bearing housing meets design requirements for the bearing housing; and
    responsive to a determination that the proposed configuration meets the design requirements for the bearing housing, saving the proposed configuration in the number of configurations.

4. The method of claim 3, wherein the design requirements comprise a rigidity for the bearing housing and a stress for the plurality of members.

5. The method of claim 3 further comprising:
    responsive to an absence of the determination that the proposed configuration meets the design requirements for the bearing housing, modifying the proposed configuration in the design; and
    performing another analysis for the proposed configuration after modifying the proposed configuration.

6. The method of claim 5 further comprising:
    repeating the steps of responsive to the absence of the determination that the proposed configuration meets the design requirements for the bearing housing, modifying the proposed configuration in the design; and performing the another analysis for the proposed configuration after modifying the proposed configuration until the proposed configuration meets the design requirements for the bearing housing.

7. The method of claim 1, wherein the curve is selected from at least one of outward from the axis and inward to the axis.

8. The method of claim 1, wherein the plurality of members have the length from the bearing section to the base and wherein at least a portion of the plurality of members have a change in the width along the length.

9. The method of claim 1, wherein the bearing section has a channel capable of receiving the bearings.

* * * * *